United States Patent
Gostev et al.

(10) Patent No.: US 10,602,397 B2
(45) Date of Patent: Mar. 24, 2020

(54) REAL-TIME RELAY OF WIRELESS COMMUNICATIONS

(71) Applicant: APPLE INC., Cupertino, CA (US)

(72) Inventors: Anatoli Gostev, San Jose, CA (US); Louay Alsakka, Cupertino, CA (US); Axel Berny, Cupertino, CA (US); Tad Dreier, Castro Valley, CA (US); Joachim Hammerschmidt, Mountain View, CA (US); Lei Li, Sunnyvale, CA (US); Xiaojun Chen, San Jose, CA (US); Vusthla Sunil Reddy, Cupertino, CA (US); Peter M. Agboh, Burlingame, CA (US); Mohit Narang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/708,521

(22) Filed: Sep. 19, 2017

(65) Prior Publication Data
US 2018/0084456 A1    Mar. 22, 2018

Related U.S. Application Data

(60) Provisional application No. 62/514,183, filed on Jun. 2, 2017, provisional application No. 62/397,675, filed on Sep. 21, 2016.

(51) Int. Cl.
*H04H 20/71* (2008.01)
*H04W 28/04* (2009.01)
(Continued)

(52) U.S. Cl.
CPC .......... *H04W 28/04* (2013.01); *H04L 1/1685* (2013.01); *H04L 1/1867* (2013.01); *H04L 69/14* (2013.01);
(Continued)

(58) Field of Classification Search
CPC ..................................... H04W 28/04
See application file for complete search history.

(56) References Cited

U.S. PATENT DOCUMENTS

| 7,756,082 B1 * | 7/2010 | Dhamdhere | H04W 36/0085 |
| | | | 370/331 |
| 8,274,996 B1 * | 9/2012 | Yuan | H04L 1/1614 |
| | | | 370/473 |

(Continued)

*Primary Examiner* — Gerald A Smarth
(74) *Attorney, Agent, or Firm* — Fay Kaplun & Marcin, LLP

(57) ABSTRACT

Exemplary embodiments include a system having a first wireless audio output device configured to connect to a source device via a first piconet and a second wireless audio output device configured to connect to the first wireless audio output device via a second piconet. A schedule of the first piconet includes a plurality of slots associated with an audio packet, a first subset of the slots used by the source device to transmit the audio packet, the first and second wireless audio output devices tuning to the first piconet to listen for the transmissions of the audio packet, and when, after a last one of the first subset of slots, the first or second wireless audio output devices did not receive the audio packet, the first and second wireless audio output devices exchange information via the second piconet such that the both wireless audio output device receive the audio packet.

16 Claims, 18 Drawing Sheets

(51) Int. Cl.
  *H04L 29/14*    (2006.01)
  *H04R 1/10*     (2006.01)
  *H04L 29/06*    (2006.01)
  *H04L 1/16*     (2006.01)
  *H04L 1/18*     (2006.01)
  *H04W 76/14*    (2018.01)
  *H04W 84/18*    (2009.01)
  *H04W 88/04*    (2009.01)
  *H04R 5/033*    (2006.01)
  *H04W 84/20*    (2009.01)
  *H04L 1/00*     (2006.01)
  *H04W 4/80*     (2018.01)
  *H04W 56/00*    (2009.01)
  *H04W 72/04*    (2009.01)

(52) U.S. Cl.
  CPC ........... *H04L 69/40* (2013.01); *H04R 1/1016* (2013.01); *H04W 76/14* (2018.02); *H04W 84/18* (2013.01); *H04L 2001/0097* (2013.01); *H04R 5/033* (2013.01); *H04R 2420/07* (2013.01); *H04W 4/80* (2018.02); *H04W 56/001* (2013.01); *H04W 72/0406* (2013.01); *H04W 84/20* (2013.01); *H04W 88/04* (2013.01)

(56) References Cited

U.S. PATENT DOCUMENTS

| | | | |
|---|---|---|---|
| 2005/0002362 A1* | 1/2005 | Kim | H04N 21/43615 370/336 |
| 2006/0030266 A1* | 2/2006 | Desai | H04W 16/14 455/41.2 |
| 2009/0031035 A1* | 1/2009 | Dharmaraju | H04W 8/005 709/230 |
| 2009/0238375 A1 | 9/2009 | Pilati et al. | |
| 2010/0182981 A1* | 7/2010 | Thoukydides | H04J 3/0658 370/336 |
| 2011/0268020 A1* | 11/2011 | Singamneni | H04W 56/0015 370/328 |
| 2012/0058727 A1 | 3/2012 | Cook et al. | |
| 2014/0099950 A1* | 4/2014 | Mildh | H04W 56/001 455/434 |
| 2015/0026317 A1* | 1/2015 | Ilsar | H04L 41/0816 709/221 |
| 2016/0191181 A1* | 6/2016 | Bailey | H04H 20/86 381/77 |
| 2017/0251469 A1* | 8/2017 | Lee | H04L 1/16 |

* cited by examiner

Table 200

Example on B2B link packet type and pay load

| Packet Type | Percentage used In typical B2B link | B2B Payload (bytes) | |
|---|---|---|---|
| | | Average | Max |
| NULL | 49% | 0 | 0 |
| POLL | 44% | 0 | 0 |
| ID | 3% | 0 | 0 |
| 2-DH1 | 4% | 33 | 38 |

FIG. 2

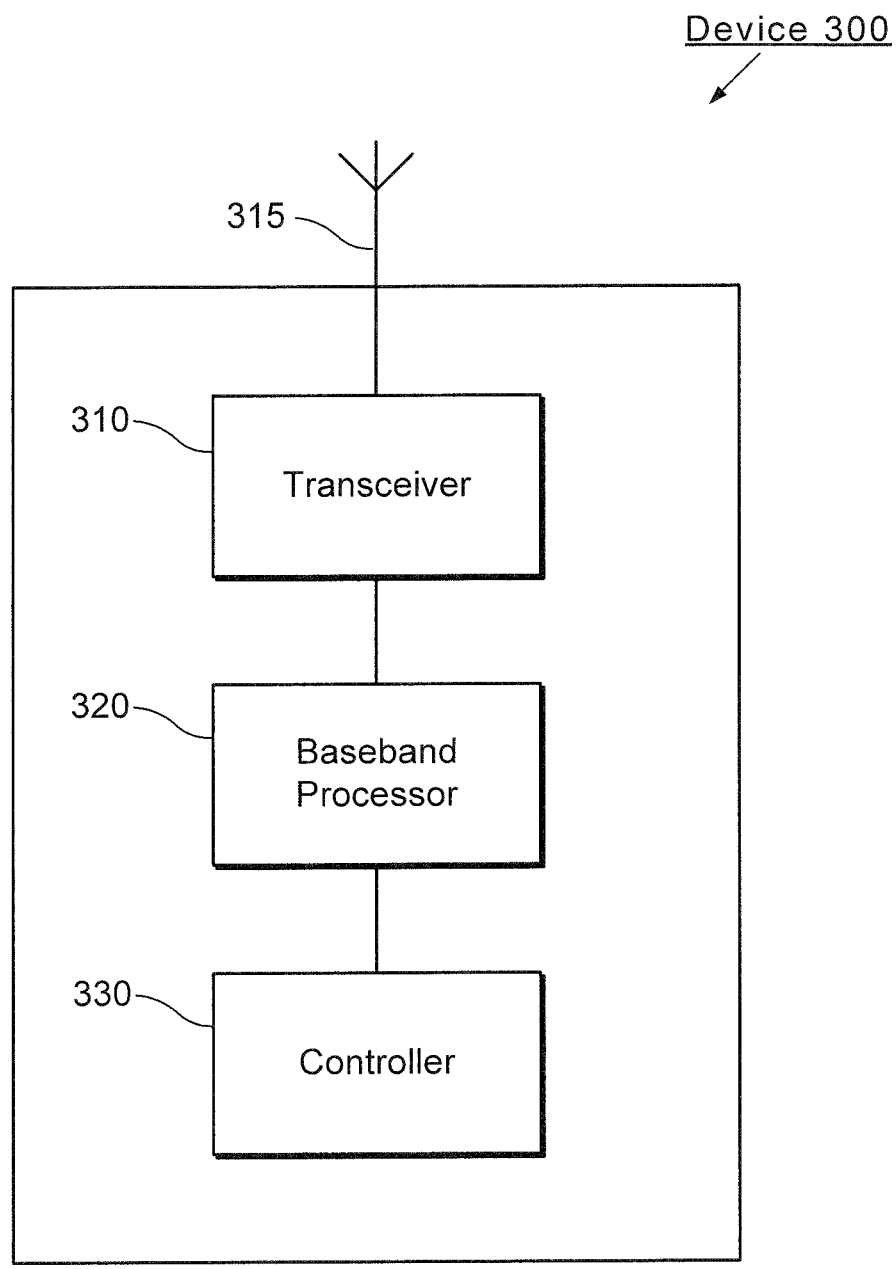
F I G. 3

Real Time relay supported maximum BT source packet payload size*
(based on sink rates and source Tx slot length)

Table 1000

| Max source packet payload supporting real time relay (bytes) | | Source-to-sink Tx slot length and rate | | | | | | | | | | |
|---|---|---|---|---|---|---|---|---|---|---|---|---|
| | | 1-slot | 3-slot | | | | | | 5-slot (ACL) | | | |
| | | | eSCO | | | ACL | | | | | | |
| | | Any rate | 1 Mbps | 2 Mbps | 3 Mbps | 1 Mbps | 2 Mbps | 3 Mbps | 1 Mbps | 2 Mbps | 3 Mbps |
| Relay link rate | 1 Mbps | N/A | 74 | 99 | 111 | 74 | 98 | 111 | 152 | 202 | 228 |
| | 2 Mbps | N/A | 99 | 148 | 178 | 99 | 147 | 177 | 203 | 303 | 365 |
| | 3 Mbps | N/A | 112 | 178 | 224 | 111 | 177 | 223 | 229 | 365 | 457 |

F I G. 10

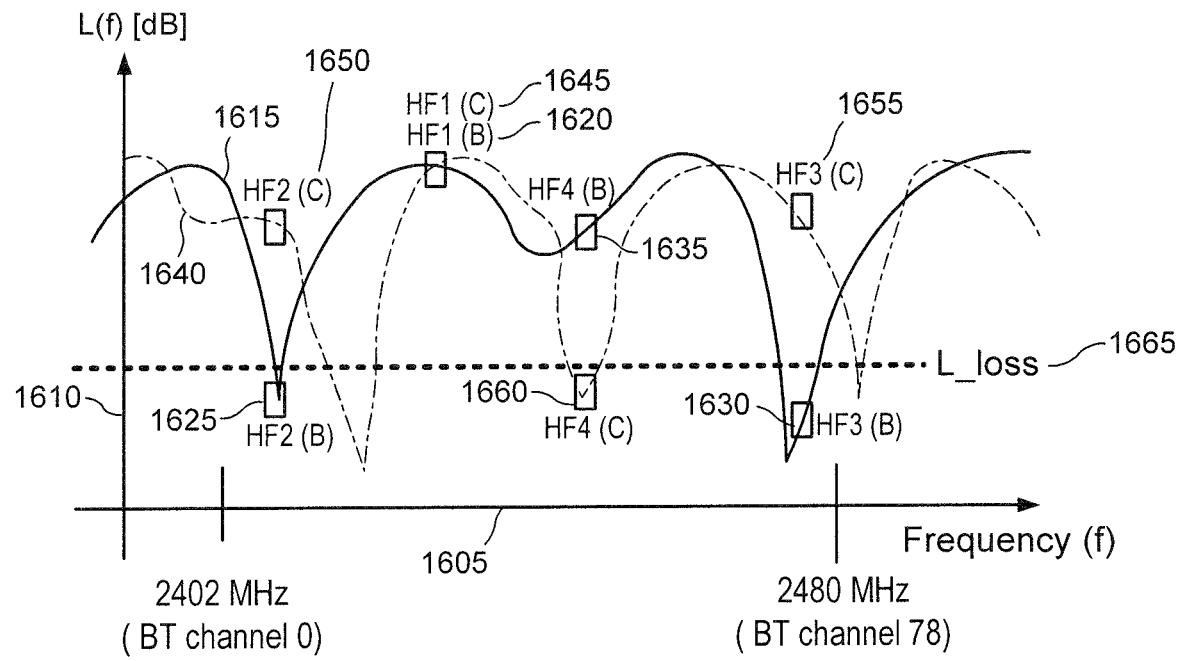
F I G. 16
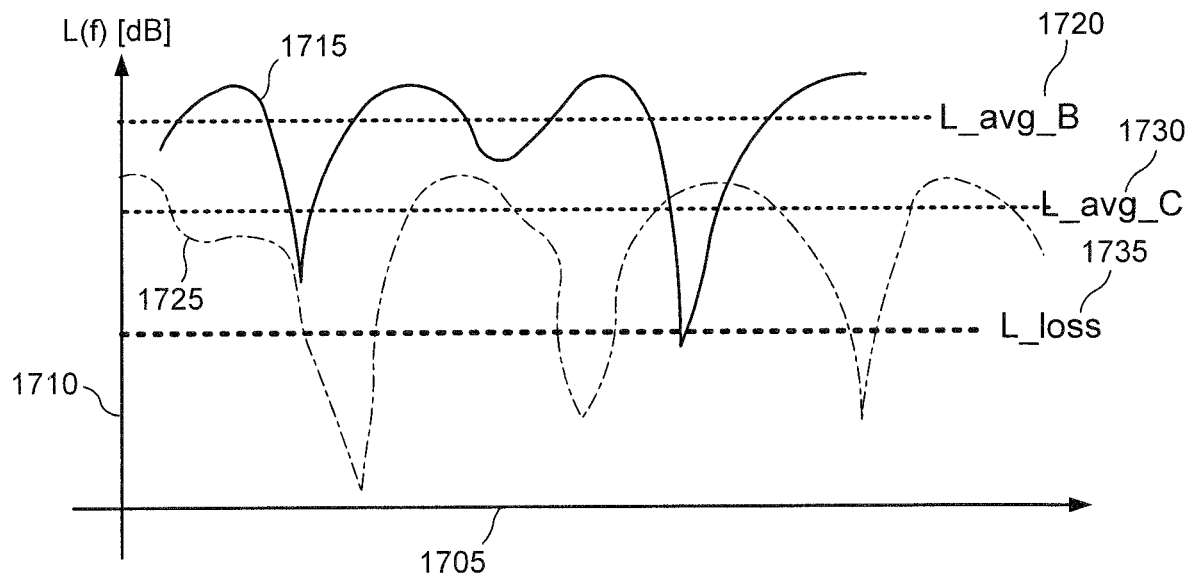
F I G. 17

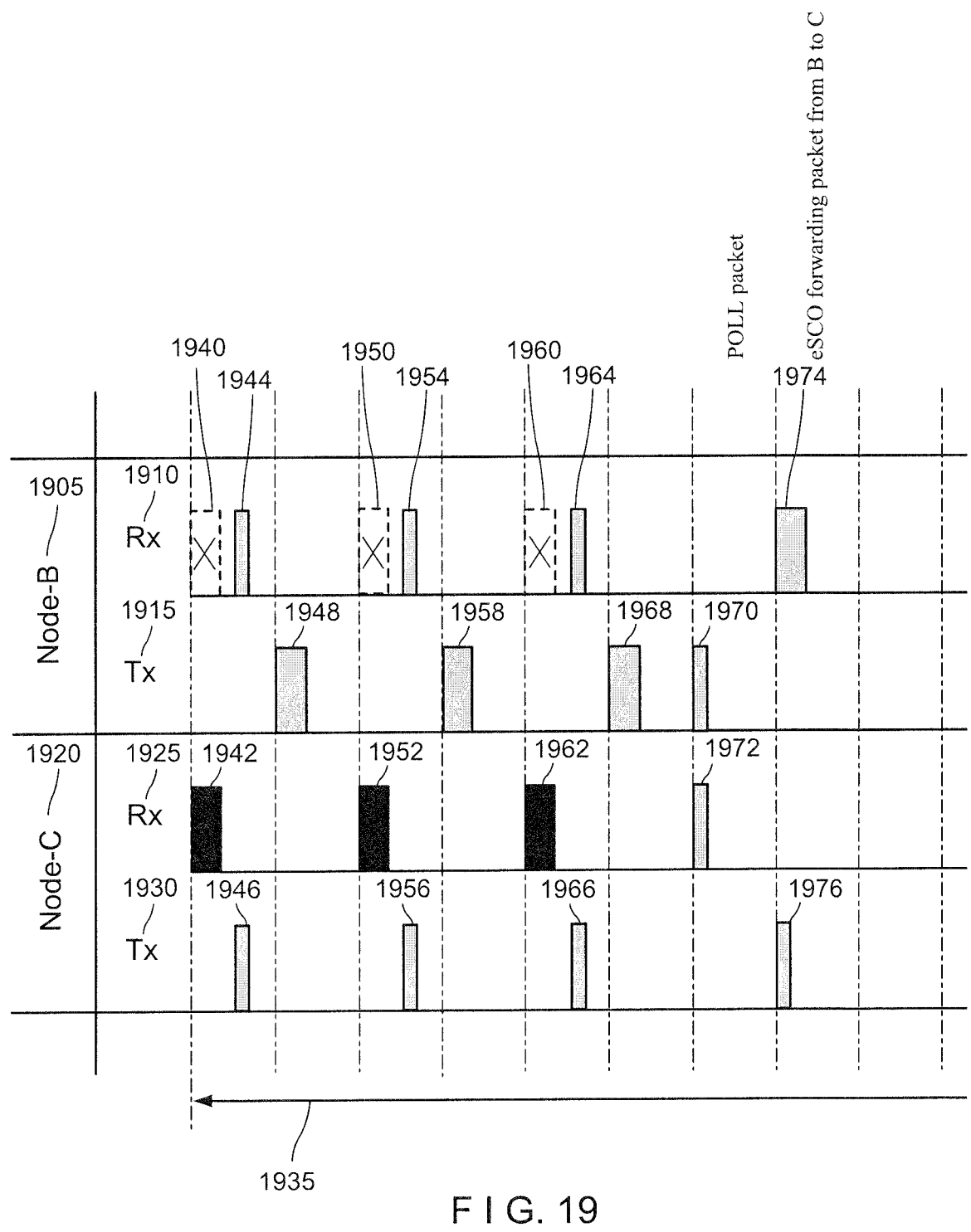
F I G. 19

REAL-TIME RELAY OF WIRELESS COMMUNICATIONS

PRIORITY/INCORPORATION BY REFERENCE

This application claims priority to U.S. Provisional Application 62/397,675 entitled "Apparatus, Systems and Methods for a Real-time Relay of Wireless Communications," filed on Sep. 21, 2016, and U.S. Provisional Application 62/514,183 entitled "Apparatus, Systems and Methods for a Real-time Relay of Wireless Communications," filed on Jun. 2, 2017, the entirety of both are incorporated herein by reference.

BACKGROUND INFORMATION

Wireless communication systems are rapidly growing in both usage and the number of connected devices. A personal area network ("PAN") may be defined as a computer network used for data transmission amongst devices such as computers, telephones, tablets, personal digital assistants, wearables, etc. For instance, a PAN may be used for communication between the devices themselves (e.g., interpersonal communication), or for connecting one or more devices to a higher level network and the Internet via an uplink, wherein one "master" device takes up the role as internet router. Furthermore, a wireless PAN is a network for interconnecting devices wherein the connections are wireless, using wireless technologies, such as Bluetooth.

A piconet consists of two or more devices occupying the same physical channel (e.g., synchronized to a common clock and hopping sequence). Typically, a piconet allows for one master (or primary) device to interconnect with up to seven active slave (or secondary) devices. For instance, examples of piconets include a cell phone connected to a computer, a laptop and a Bluetooth-enabled digital camera, or several tablet computers that are connected to each other.

When two or more independent, non-synchronized Bluetooth piconets overlap, a scatternet is formed in a seamless, ad-hoc fashion allowing for inter-piconet communication. In other words, a scatternet is a type of computer network consisting of two or more piconets, wherein a Bluetooth node may be a master in one piconet and a slave in one or more other piconets. Within a piconet having at least three devices, such as a source device acting as a master and two wireless audio devices as slaves, the two slaves may need to receive synchronization data from the master. However, a user may experience audio glitches if only one slave device receives audio packets while the other slave device has poor reception from the master. Accordingly, the audio quality and range of the piconet may be limited to the weaker of the two links of the slaves. Accordingly, a need exists for a real-time relay of wireless communications within a scatternet.

SUMMARY

Some exemplary embodiments are directed to a method performed by a first wireless audio output device configured to connect to a source device via a first piconet and configured to connect to a second wireless audio output device via a second piconet, wherein the second wireless audio output device is configured to eavesdrop on the first piconet, and wherein the source device is configured to transmit an audio packet via the first piconet using at least one of a plurality of transmission slots. The method including determining whether the first and second wireless audio output devices successfully received the audio packet after a last one of the plurality of transmission slots and when, after the last one of the transmission slots, at least one of the first or second wireless audio output devices did not successfully receive the audio packet during any of the plurality of transmission slots, relaying the audio packet between the first and second wireless audio output devices via the second piconet such that both the first and second wireless audio output devices receive the audio packet.

Some other exemplary embodiments are directed to a system including a first wireless audio output device configured to connect to a source device via a first piconet and a second wireless audio output device configured to connect to the first wireless audio output device via a second piconet and further configured to eavesdrop on the first piconet. A schedule of the first piconet includes a plurality of slots associated with an audio packet, a first subset of the slots reserved for transmission attempts by the source device to transmit the audio packet, the first and second wireless audio output devices tuning to the first piconet at times corresponding to the first subset of the slots to listen for the transmissions of the audio packet, and wherein when, after a last one of the first subset of slots, at least one of the first or second wireless audio output devices did not successfully receive the audio packet during any of transmission attempts, the first and second wireless audio output devices exchange information via the second piconet such that the at least one of the first or second wireless audio output devices that did not successfully receive the audio packet receives the audio packet.

Still other exemplary embodiments are directed to a method performed by a first wireless audio output device configured to connect to a second wireless audio output device via a first piconet and configured to eavesdrop on a second piconet formed between the second wireless audio output device and a source device, and wherein the source device is configured to transmit an audio packet via the second piconet using a plurality of transmission slots. The method including listening to the second piconet at predetermined times associated with the plurality of transmission slots of the audio packet, after all of the transmission slots for the audio packet have ended, tuning to the first piconet and when the audio packet was not successfully received, listening to the first piconet at a predetermined time for the second wireless audio output device to transmit the audio packet.

BRIEF DESCRIPTION OF THE DRAWINGS

FIG. 2 shows an exemplary table for the packet types and payload of an audio bud-to-audio bud ("B2B") piconet for wireless audio headphones.

FIG. 3 shows an exemplary device (e.g., wireless audio buds) for mitigating scheduling conflicts in wireless communication devices according to various embodiments described herein.

FIG. 10 shows an exemplary table for real-time relay supported maximum Bluetooth source packet payload sizes based on link rates and slot length for the source transmission.

FIG. 16 shows a first exemplary spectral fading curve over a set of frequencies for two audio buds B and C according to various embodiments described herein.

FIG. 17 shows a second exemplary spectral fading curve over a set of frequencies for two audio buds B and C according to various embodiments described herein.

FIG. 19 shows a second private exchange scheme between the audio buds B and C over the B2B piconet according to various embodiments described herein.

DETAILED DESCRIPTION

Figure 1:
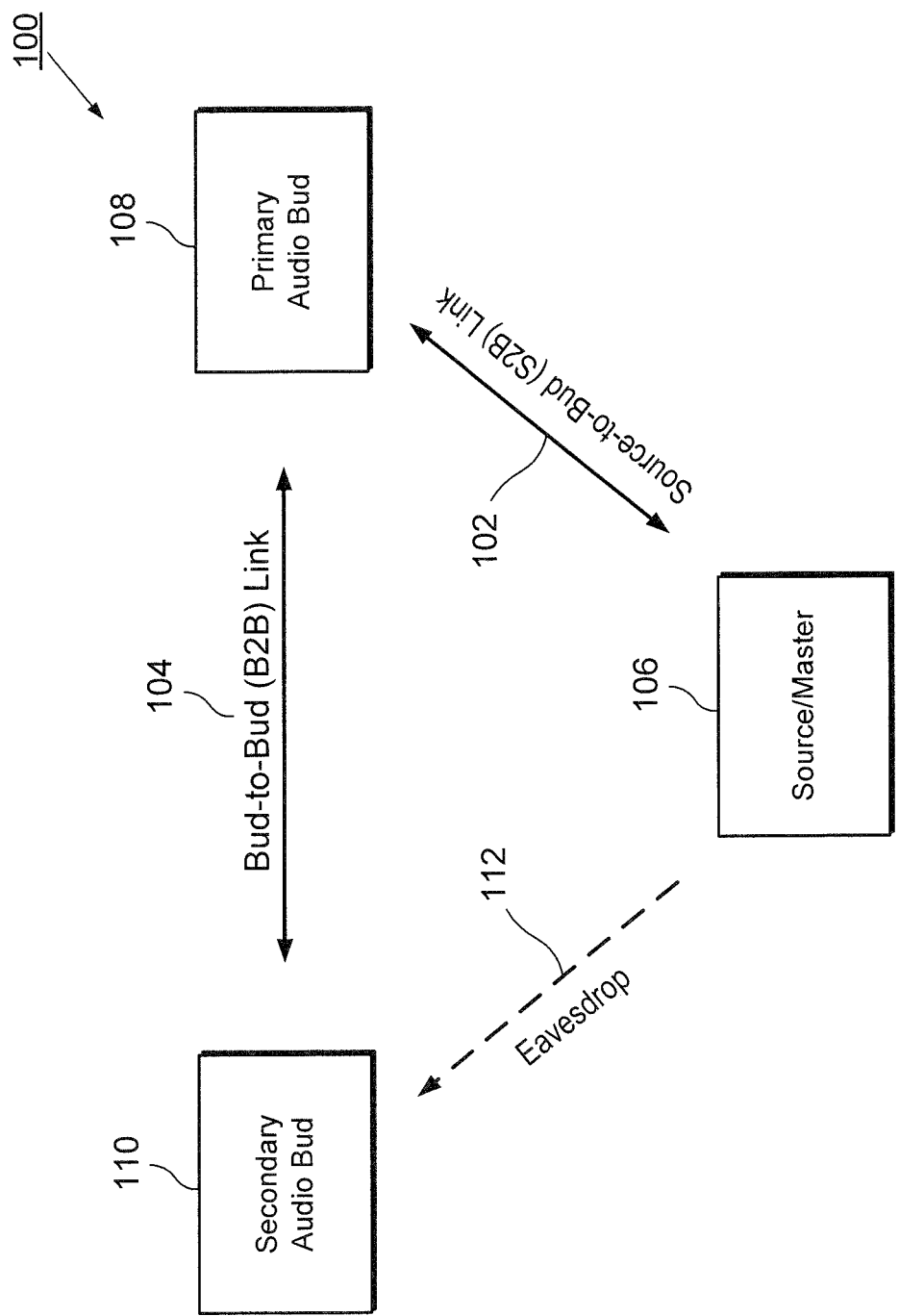
FIG. 1 shows an exemplary embodiment of a scatternet including two piconets and for use in wireless audio headphones.

The exemplary embodiments may be further understood with reference to the following description and the appended drawings, wherein like elements are referred to with the same reference numerals. The exemplary embodiments describe an apparatus, system and method to compensate for dropped packets over a piconet in wireless communication devices within a scatternet. It should be noted that while the exemplary embodiments described herein refer to scheduling transmissions in a Bluetooth scatternet, any type of network may implement the systems and methods described herein, and thus the various embodiments are not limited to a Bluetooth scatternet or piconets in general. Furthermore, while exemplary embodiments described herein may relate to a scatternet for use with wireless audio buds (e.g., wireless earbuds), the systems and methods may be applied to connecting any wireless device and is not limited to wireless audio buds.

Those skilled in the art will understand that the current methodology for using multiple piconets relies on the devices to independently receive packets of data. With a single source and two receiving devices, scenarios may arise where both receiving devices receive packets from the source, only one of the two receiving devices receives packets from the source, or both of the receiving devices fail to receive the packets from the source. In the exemplary embodiments that describe wireless audio buds, these packet drops, glitches, etc., may result in an unsatisfactory audio experience for the user, particularly when only one of the audio buds receives the packets to provide an audio output on only one side.

FIG. 1 shows an exemplary embodiment of a scatternet 100 including two piconets 102 and 104 for use with two wireless audio buds 108, 110 (e.g., wireless earbuds) in communication with a source device 106 (e.g., a mobile phone). The first piconet 102 is a source-to-audio bud ("S2B") piconet, wherein the source device 106 is the master and a primary audio bud 108 is a slave. The second piconet 104 is an audio bud-to-audio bud ("B2B") piconet, wherein the primary audio bud 108 is the master and a secondary audio bud 110 is a slave. In some implementations, one or more other devices also may be present in either or both of the first piconet 102 and the second piconet 104. It is noted that while the source device 106 may not be aware of the presence of the secondary audio bud 110, the secondary audio bud 110 may "eavesdrop" 112 on the source device 106 as it communicates with the primary audio bud 108. Specifically, the secondary audio bud 110 may know the schedule for communications between the secondary audio bud 110 and the primary audio bud 108 on the B2B piconet 104. When there are no scheduled communications on the B2B piconet 104, the secondary audio bud 110 may eavesdrop on the communication between the source device 106 and the primary audio bud 108 over the S2B piconet 102. Since it is generally assumed that the secondary audio bud 110 and the primary audio bud 108 will be in close physical proximity to each other, the secondary audio bud 110 may have generally the same (or in some cases, an even better) communication channel to listen to communications from the source device 106.

The B2B piconet 104 may be used for audio synchronization and general control (e.g., battery life, adaptive frequency hopping ("AFH") map updates, etc.) between the two audio buds 108 and 110. FIG. 2 shows an exemplary table 200 for the packet types and payload(s) of the B2B piconet 104. As illustrated in table 200, the packet types may include NULL packets, POLL packets, ID packets, and payload packets (e.g., 2-DH1 Bluetooth packets). The NULL and POLL packets may be characterized as short general control packets that utilize the greatest portion of the B2B link. Thus, as can be seen from the table 200, a great number of the packets exchanged over the B2B piconet 104 may have a small payload. As will be described in greater detail below, the B2B piconet 104 may be used to compensate for scenarios when only one of the audio buds 108, 110 receive data from the source device 106 such that both audio buds 108, 110 receive the data.

According to the exemplary embodiments of the systems and methods described herein, a B2B link transmission operation may be used to compensate for the above noted scenarios. The exemplary B2B link transmission operation will be described in greater detail below, but may be described in general as using available time within a scheduling interval (e.g., a slot) associated with transmissions being performed over the S2B piconet 102 to schedule communications for the B2B piconet 104. Using the available time in the S2B piconet 102 scheduling interval (e.g., time when there are no communications scheduled over the S2B piconet 102) for the B2B piconet 104 communications may compensate for the above noted scenarios.

It is noted that the available time in which transmissions are to be scheduled and performed over the B2B piconet 104 may not include time that may be used for other operations to be performed such that the transmissions may be performed. Those skilled in the art will understand that there are various slot schemes that may be used for transmissions over the S2B piconet 102. The exemplary embodiments may be utilized with any of these slot schemes in which an available time is identified and used. However, as the slot schemes may require certain hardware operations (e.g., tuning for reception or transmission, tuning to a channel or frequency, etc.), there may be one or more inter-frame spacing ("IFS"). The IFS may be defined as the time gap between frames for switching between transmission and reception, baseband processing, etc. For example, the IFS may be a hardware constraint to allow the various hardware components of the primary audio bud 108 and the secondary audio bud 110 to tune from the S2B piconet 102 to the B2B piconet 104 or switch between a transmission period and a reception period. No communication should occur during this IFS to allow the hardware components to be set up properly to commence communications. Minimizing the IFS design (e.g., the time for IFS) may allow for communications to meet the maximum supported B2B payload requirements.

FIG. 3 shows an exemplary device 300 (e.g., wireless audio buds) for compensating for dropped packets in wireless communication devices according to various embodiments described herein. The device 300 may represent any electronic device (e.g., primary audio bud 108) that is configured to perform wireless functionalities, such as but not limited to communicating with a master device (e.g., the source device 106) as well as a slave device (e.g., the secondary audio bud 110). However, it is noted that the device 300 may also represent the other components of the exemplary scatternet, such as the source device 106 and the secondary audio bud 110.

Furthermore, it is noted that the device 300 is not limited to audio buds and may represent any portable wireless device, such as, but not limited to a wearable computing device, a mobile phone, a tablet computer, a personal computer, a VoIP telephone, an Internet of Things (IoT) device, etc. The device 300 may also be a client stationary device such as a desktop terminal.

The exemplary device 300 may include a transceiver 310 connected to an antenna 315, a baseband processor 320, and a controller 330, as well as other components. The other components may include, for example, a memory, a battery, ports to electrically connect the device 300 to other electronic devices, etc. The controller 330 may control the communication functions of the transceiver 310 and the baseband processor 320. In addition, the controller 330 may also control non-communication functions related to the other components, such as the memory, the battery, etc.

According to one embodiment, the baseband processor 320 may be a chip compatible with a wireless communication standard, such as Bluetooth. The baseband processor 320 may be configured to execute a plurality of applications of the device 300. For example, the applications may include the methods and operations related to the exemplary embodiments where scenarios involving only one of the audio buds 108, 110 receiving a data packet is compensated for by using a relay mechanism as will be described in detail below. Additionally, the transceiver 310 may also be configured to execute a plurality of applications of the device 300. For example, the applications may include the methods and operations related to the exemplary embodiments.

Real-Time Relay of Wireless Communications

Figure 4:
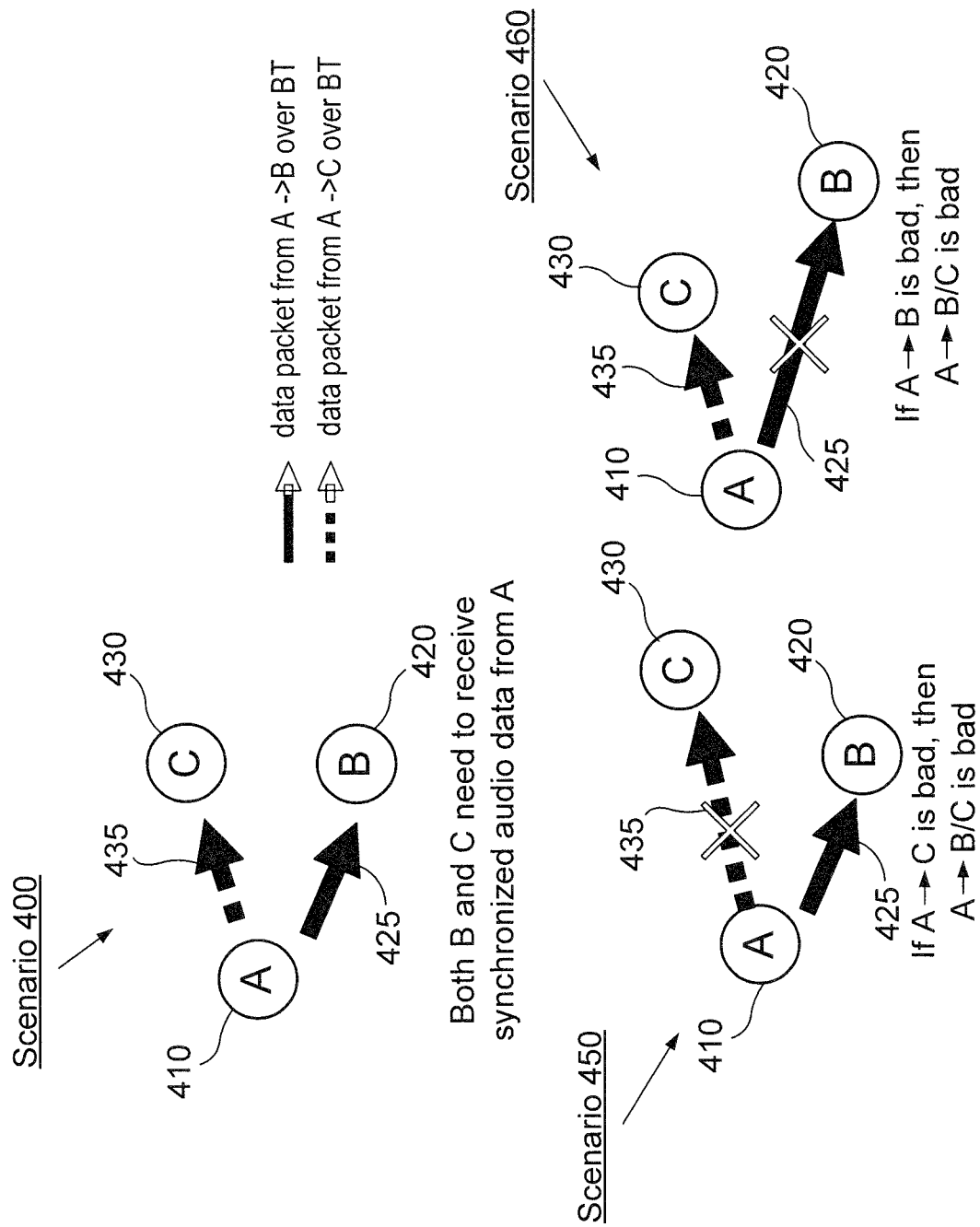
FIG. 4 shows an exemplary source device communicating with two unwired audio buds over a short-ranged wireless network, such as a Bluetooth network.

In an exemplary piconet scenario 400 depicted in FIG. 4, a source device A 410 may communicate with two unwired audio buds (e.g., a first wireless audio bud B 420 for the right ear and a second wireless audio bud C 430 for the left ear) over a short-ranged wireless network, such as a Bluetooth network.

In this scenario, the source device A 410 acts as the master while each of the wireless audio buds B 420 and C 430 act as the slaves or "audio sinks." One skilled in the art would understand that an audio sink may be defined as a device that acts as a sink of a digital audio stream delivered from a source over a shared piconet. More specifically, the source device A 410 may communicate with the wireless audio bud B 420 via Bluetooth link 425, represented by the solid line in FIG. 4, for transmitting data packets from A→B over a shared S2B piconet. Likewise, the source device A 410 may communicate with the wireless audio bud C 430 via Bluetooth link 435, represented by the dashed line in FIG. 4, for transmitting data packets from A→C over a shared S2B piconet.

Furthermore, each of the wireless audio buds B 420 and C 430 may receive ("Rx") synchronized data from the source device A 410 within limited time intervals. Without such synchronization, the user of the source device A 410 and wireless audio buds B 420 and C 430 may experience audio glitches, wherein one of the audio buds receives the data packets while the other audio bud does not. For instance, in scenario 450, the A→B Bluetooth link 425 may be operational while the A→C Bluetooth link 435 may not be available or may not be functioning properly due to poor radio frequency, interference, fading, etc. Alternatively, in scenario 460, the A→C Bluetooth link 435 may be operational while the A→B Bluetooth link 425 may be unavailable. In either of the depicted scenarios 450 or 460, the audio quality and range of the piconet is limited by the weaker of the two links. This may cause a poor user experience for the user of the wireless audio buds 420, 430.

Figure 5:
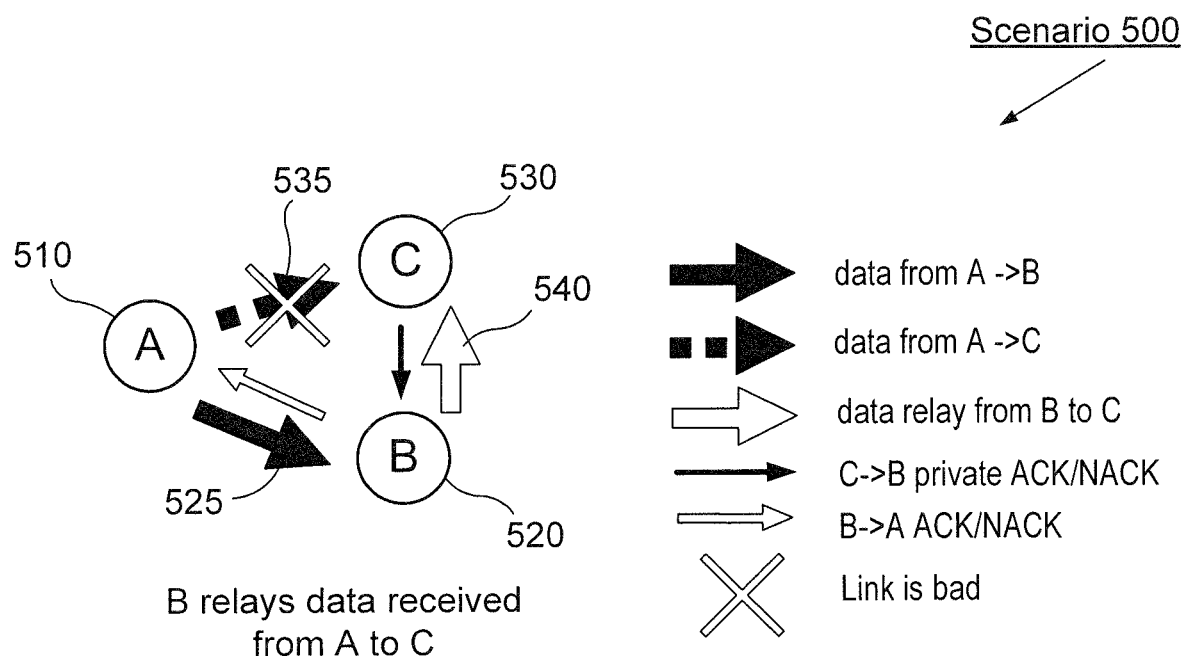
FIG. 5 shows a further exemplary source device communicating with two unwired audio buds over a short-ranged wireless network, such as a Bluetooth network.

In a further exemplary scatternet scenario 500 depicted in FIG. 5, a source device A 510 may communicate with two wireless audio buds B 520 and C 530 over a Bluetooth network. Specifically, an A→B link 525 may be established between the source device A 510 and the wireless audio bud B 520 and an A→C link 535 may be established between the source device A 510 and the wireless audio bud C 530. Furthermore, both of the wireless audio buds 520 and 530 may form a private B2B piconet 540 for relaying data packets, wherein the wireless audio bud B 520 is the master and the wireless audio bud C 530 is the slave.

Accordingly, if the audio bud B 520 receives data packets from the source device A 510 and the audio bud C 530 does not, then the audio bud B 520 may relay source data packets to the audio bud C 530 after the audio bud B 520 acknowledges ("ACK") to source device A 510 that the packets were delivered. In other words, the audio bud B 520 may relay data received from source device A 510 to the audio bud C 530. The audio bud C 530 may privately acknowledge or not acknowledge (ACK/NACK) receipt of the data relay to the audio bud B 520 over the B2B piconet 540.

According to the exemplary systems and methods described herein, a real-time relay scheme may form a private piconet between multiple sink devices. This private piconet may allow for a source data packet received from one sink device to be relayed to one or more other sink devices that were unable to receive the packet. For instance, the relay source data packet may be transmitted over the B2B piconet using the remaining time in the source transmission slot ("Tx slot"). As will be described in further detail below, the ACK message to the source device may be transmitted in a following source reception slot ("Rx slot")

and thus guarantee that all of the sink devices receive the source data packets in a timely manner.

It is noted that one or more quality measures or characteristics of the B2B link between the sink devices may be better than those of the S2B links between the source device and the sink devices. This may be due to any number of factors, such as the sink devices remaining in close proximity to one another with minimal (or reduced) relative movement, while the source device may be further away with varying distance to one or more of the sink devices. When the B2B link is better than one or more of the S2B links, shorter data packets with a high rate of transmission may be used to relay the same amount of source payload between the sink devices. Depending on the source data packet size and frame length, the sink device may negotiate with the source device to ensure that the source device provides enough remaining time in the same source Tx slot for real-time relay. Thus, as opposed to any Bluetooth relay methods that may impact the source link and not guarantee relay deliveries, the exemplary embodiments described herein may have minimal or no impact on the S2B source link and receipt of the ACK from one of the sinks at the source device is a guarantee that both sinks have received delivery of the source packet.

The benefits of the exemplary systems and methods described herein include improvements in quality of service ("QoS") such as audio quality, improvements in range, a reduction in the network bandwidth and power consumption, reduced retransmissions and thus, improvements in co-located radio coexistence (e.g., multiple 2.4 GHz radio device may be located in close proximity with minimal interference, etc.).

It is noted that while the exemplary embodiments described herein may refer to the use of two wireless audio buds in communication with a source device, the systems and methods may be applied to any number of wireless devices using various applications, such as, but not limited to Bluetooth audio earphones, wireless speakers, range extenders, routers and other networking equipment, time-sensitive wireless applications, Internet of Things ("IoT") applications, fitness/medical devices, sensors, etc.

According to one exemplary embodiment, the wireless audio sinks may determine which sink should be designated as the primary and which sink(s) should be designated as the secondary. Specifically, the wireless audio buds may negotiate with each other and select the audio bud having the best source reception based on any number of factors, such as, but not limited to, RSSI, PER, etc., as the primary. The primary sink may be responsible for transmitting ACK/NACK messages to the source device, as well as negotiating with the source device. The remaining sink(s) may become secondary sink(s) and may not directly interact with the source device, except for passively listening (e.g., "eavesdropping") and receiving packets from the source device that were sent to the primary wireless audio bud. The source device may not be aware of the existence of the secondary sink(s) because it may have no direct data exchange with the secondary sink(s).

Figure 6:
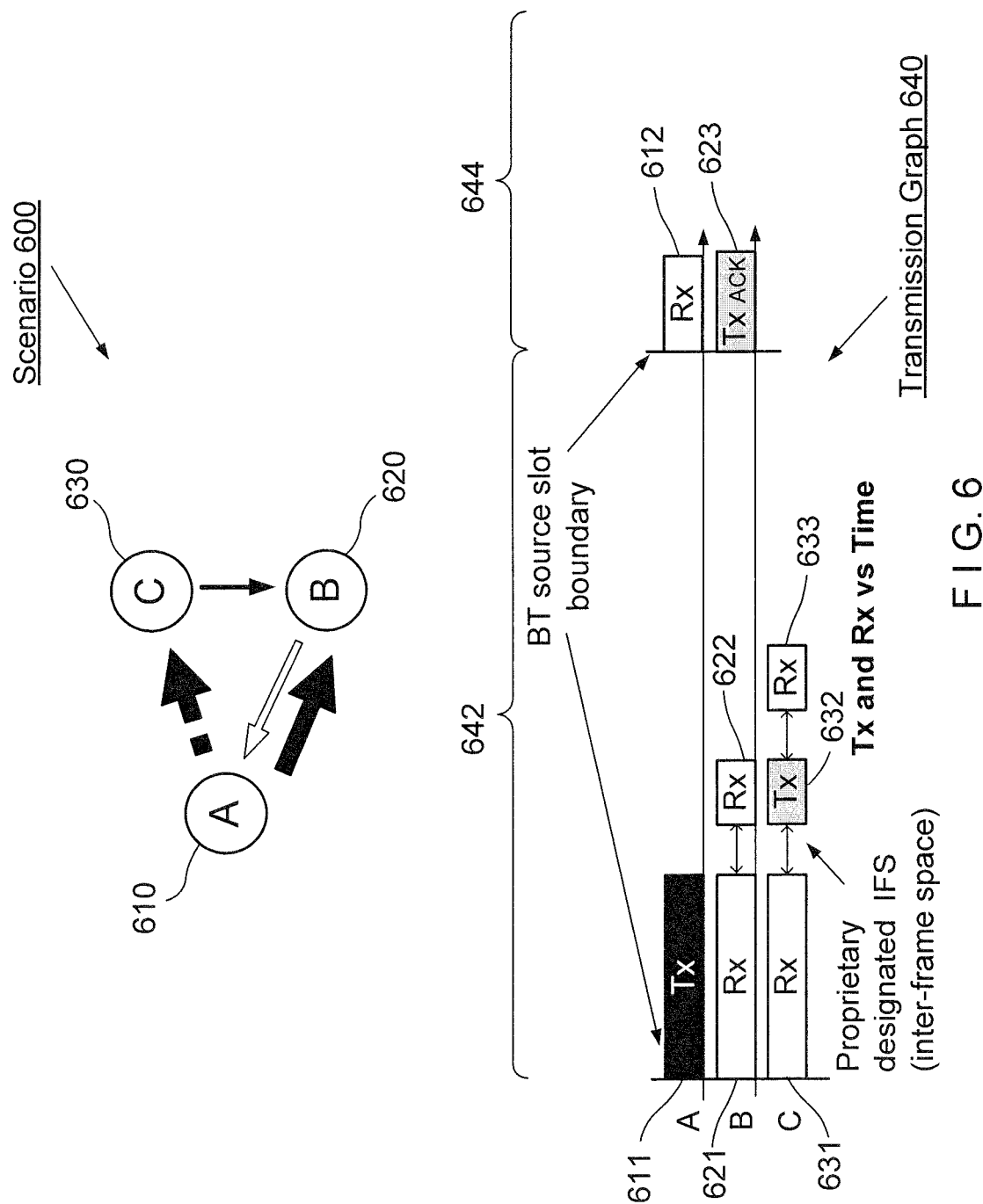
FIGS. 6-9 show various exemplary circumstances in which data transmissions occur and fail to occur between a source device A and the two audio buds B and C according to various embodiments described herein.
Figure 7:
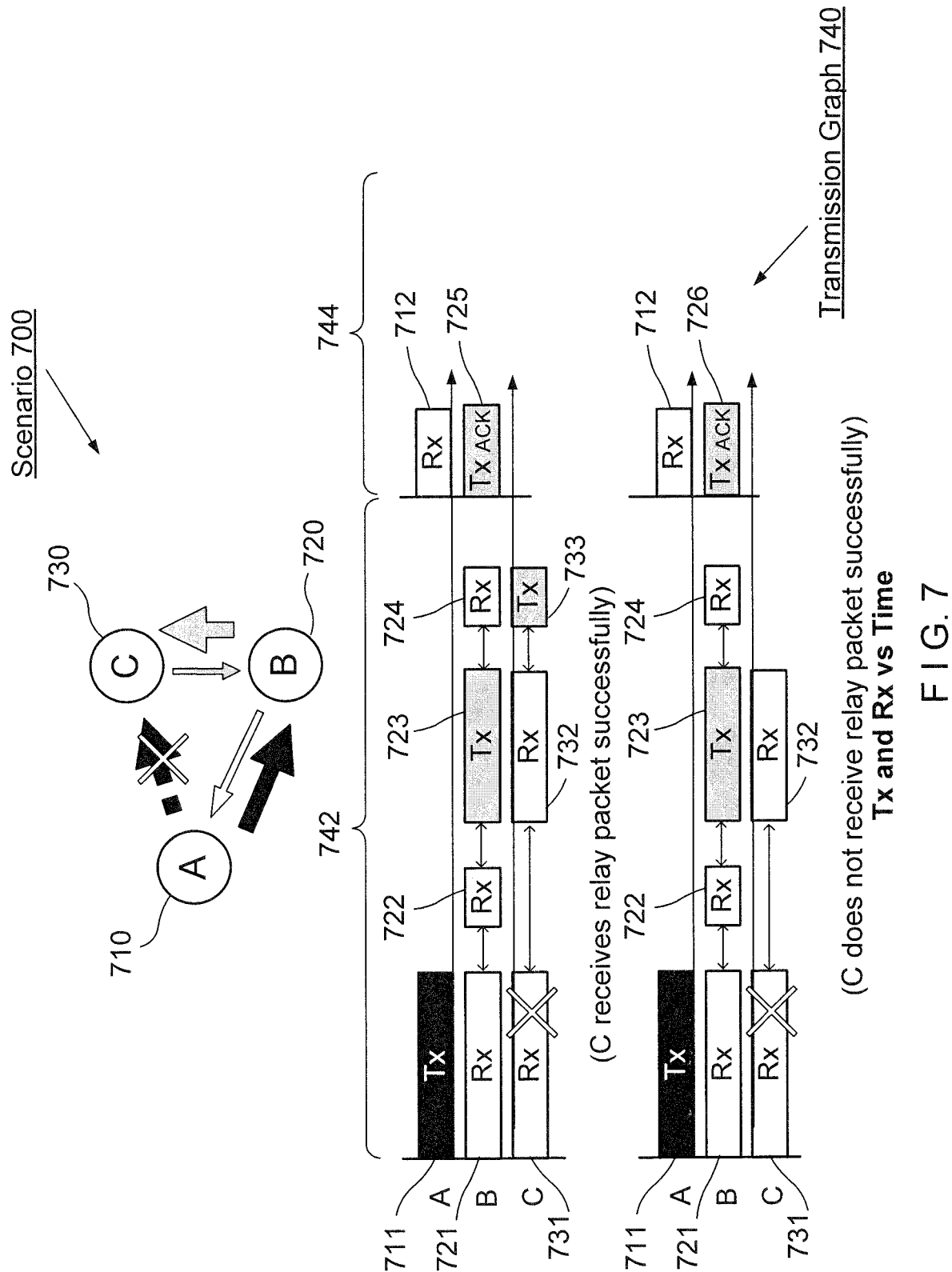
Figure 8:
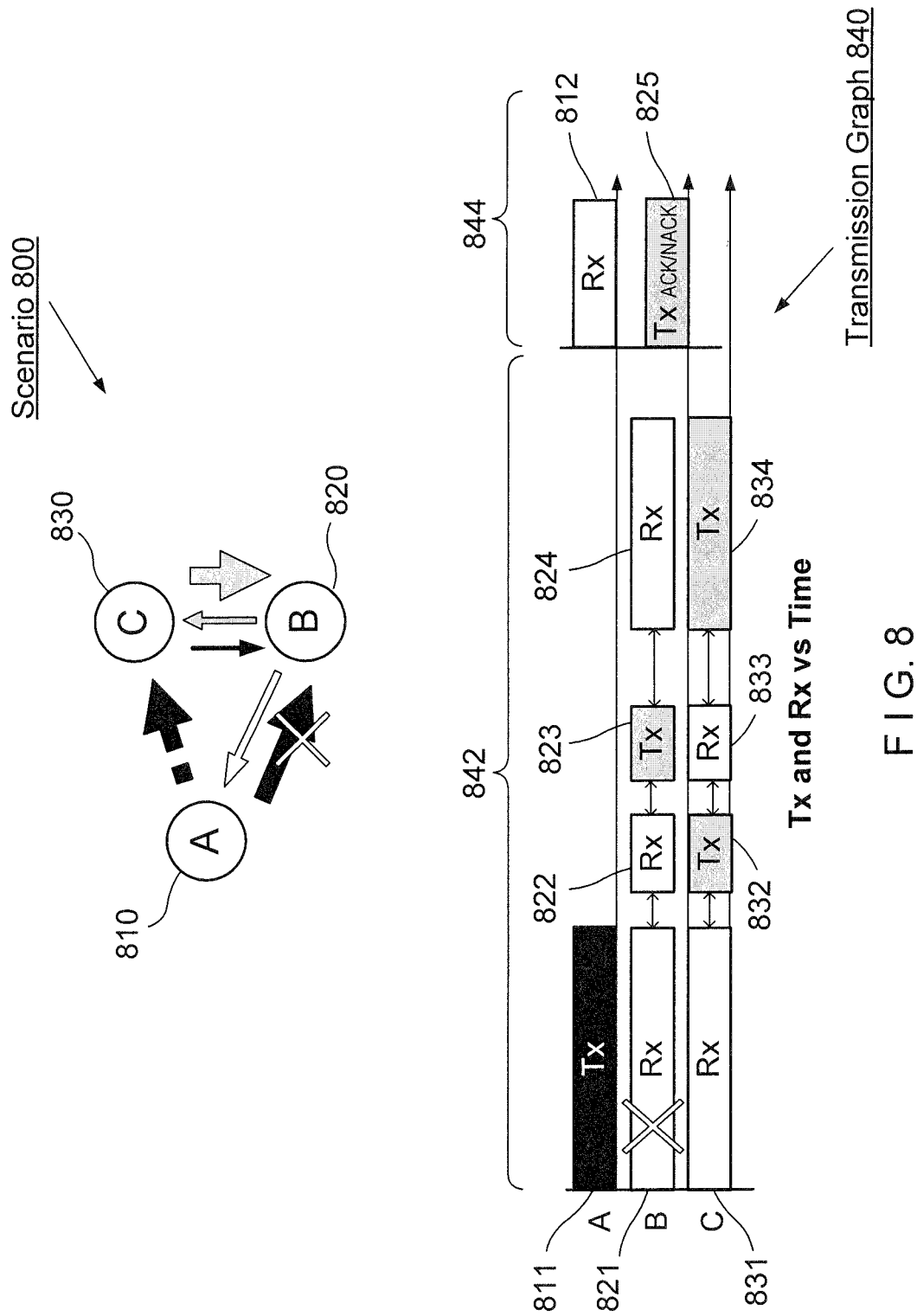
Figure 9:
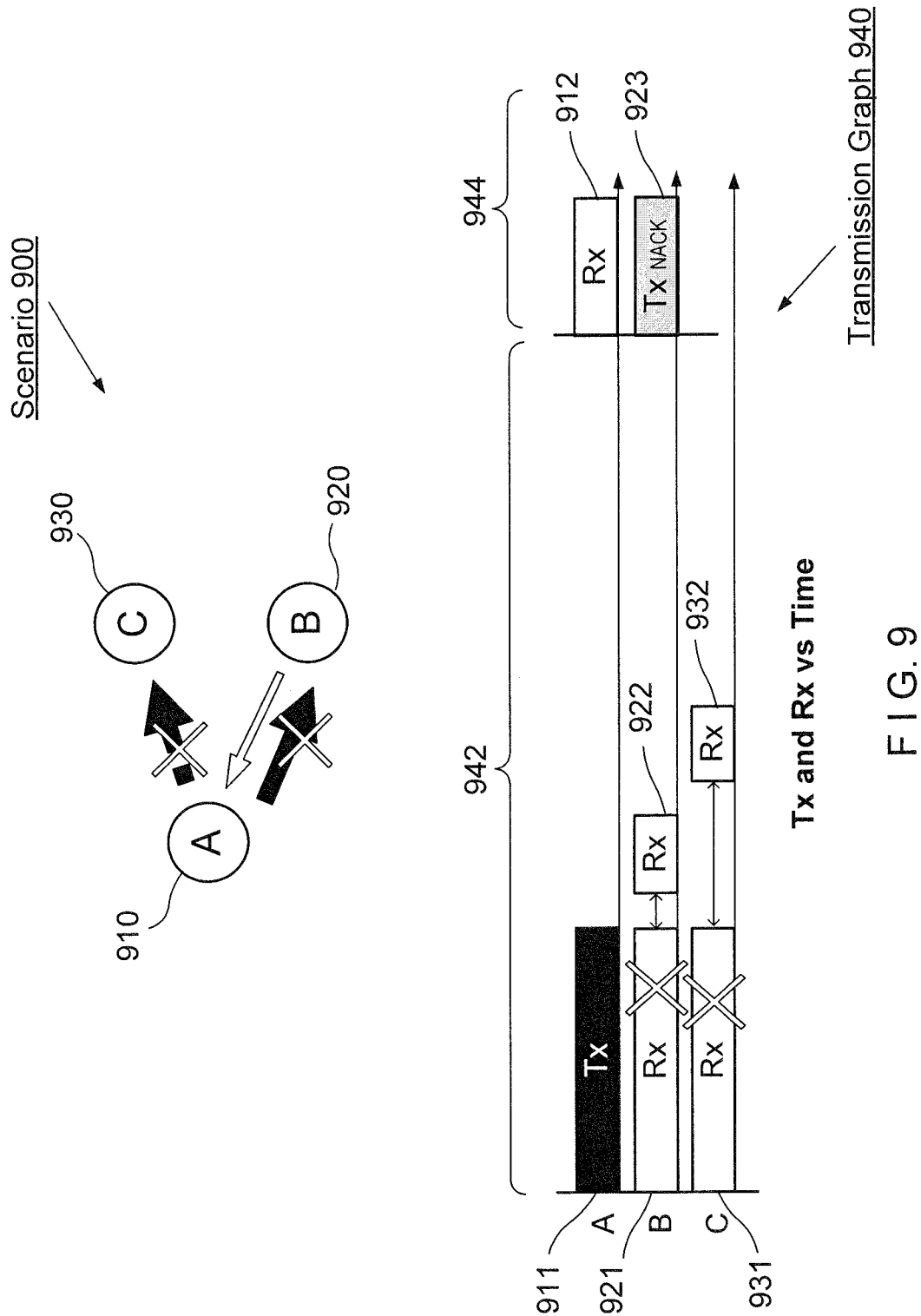

In various exemplary scatternet scenarios depicted in FIGS. 6-9, a source device A 610, 710, 810, 910 may communicate with wireless audio bud B 620, 720, 820, 920 and wireless audio bud C 630, 730, 830, 930 over a piconet network (e.g., using Bluetooth). As described above, the source device A may only have a master/slave relationship in an S2B piconet with one of the audio buds, while the other audio bud is a slave in a B2B piconet with the audio bud in the S2B piconet. FIGS. 6-9 may represent the various circumstances in which data transmissions occur and fail to occur between a source device A and the two audio buds B and C. For instance, FIG. 6 depicts a scenario 600 in which both wireless audio buds B 620 and C 630 successfully receive a source packet from the source device A 610. FIG. 7 depicts a scenario 700 in which audio bud C 730 has a bad link with the source device A 710 and only audio bud B 720 successfully receives a source packet from the source device A 710. FIG. 8 depicts a scenario 800 in which audio bud B 820 has a bad link with the source device A 810 and only audio bud C 830 successfully receives a source packet from the source device A 810. Finally, FIG. 9 depicts a scenario 900 in which both audio buds B 920 and C 930 have bad links with the source device A 910 and neither receive a source packet from the source device A 910. Each of these exemplary scenarios will be described in great detail below.

Furthermore, FIGS. 6-9 each include transmission graphs 640, 740, 840 and 940, respectively, each having multiple slots for transmission and reception over time. For instance, transmission graph 640 may include a slot 642 for S2B transmission communication (e.g., a Tx slot) from source device A to the audio buds B 620 and C 630, and a slot 644 for S2B reception of communication (e.g., a Rx slot) from the audio buds B 620 and C 630 to source device A. Likewise, transmission graphs 740, 840 and 940 may include TX slots 742, 842 and 942, respectively, and Rx slots 744, 844 and 944, respectively. It is noted that the Tx slots and the Rx slots may be described from the perspective of the exemplary source device A 610 acting as a master to one of the slave devices (e.g., primary audio bud). Accordingly, the source device A 610 may transmit the source packet within the Tx slot 642 and may receive a transmission (e.g., an ACK or NACK) within the Rx slot 644.

In each of the scenarios described with reference to FIGS. 6-9, it will be considered that the source device A and the audio bud B have formed the S2B piconet (e.g., the source device A is the master and the audio bud B is the slave). It will further be considered that the audio bud B and the audio bud C have formed the B2B piconet (e.g., audio bud B is the master and audio bud C is the slave). However, it should be understood that the S2B piconet may be formed between the source device A and the audio bud C, and that the master/slave relationship in the B2B piconet may be reversed. In addition, in this exemplary arrangement, when it is described that the source device A is transmitting data to the audio bud C or that the audio bud C is receiving data from the source device A, it should be understood that since the audio bud C is not a member of the S2B piconet, the source device A is not directly transmitting data to the audio bud C, but rather audio bud C is eavesdropping on the S2B communications in a manner that was previously described.

In FIG. 6, both of the wireless audio buds B 620 and C 630 receive the source packet from the source device A 610, and thus, there is no need to relay the source packet between the audio buds B 620 and C 630. In this scenario 600, both audio buds B 620 and C 630 may tune to the S2B piconet during the source Tx slot 642 and listen/receive a source packet Tx 611 that is transmitted from the source device A 610 to audio bud B 620. Specifically, both audio bud B 620 and C 630 may have available Rx times, 621 and 631, respectively, to listen/receive the Tx packet 611. As noted above, the audio bud C 630 may be aware of and receive the source packet Tx 611 by eavesdropping on the source device A 610.

If the audio bud C 630 successfully receives the source packet 611, the audio bud C 630 may send a short private Tx ACK 632 via the B2B piconet to the audio bud B 620 immediately following the A→B transmission. That is, after receiving the source packet 611, the audio buds 620 and 630 may tune to the B2B piconet during the Tx slot 642 to perform various communications between the audio buds 620 and 630. It is noted that in between each of the transmissions and receptions throughout this scenario, interframe spaces ("IFSs") may be used to coordinate communications as previously described above. The audio bud B 620 may have an available Rx time 622 to listen/receive the ACK Tx packet 632. After sending the private Tx ACK 632, the audio bud C 630 may then listen for a short period in Rx time 633 for any potential C→B relay requests from the audio bud B 620. The audio buds 620 and 630 may then tune back to the S2B piconet and in the following Rx slot 644. The audio bud B 620 may send a Tx ACK 623 to source device A 610 if the audio bud B 620 successfully received the source TX packet 611 and successfully received the private Tx ACK 632 from the audio bud C 630. Otherwise, the audio bud B 620 may transmit a NACK (Tx NACK) to the source device 610 during the Rx slot 644. Accordingly, the source device A 610 may have an available listen/receiver time 612 for such ACK/NACK communications from the audio bud B 620.

In FIG. 7, only the wireless audio bud B 720 received the source packet 711 from the source device A 710 while the audio bud C 730 failed to receive the source packet 711 from the source device A 710 (e.g., due to a bad link). In this scenario 700, both audio buds B 720 and C 730 may tune to the S2B piconet during the source Tx slot 742 and listen/receive a Tx source packet 711, however the audio bud B 720 during Rx time 721 successfully receives the packet 711 while the audio bud C 730 during Rx time 731 fails to receive the packet 711. Similar to the scenario in FIG. 6, after the Rx times 721 and 731, the audio buds B 720 and C 730 may tune to the B2B piconet and the audio bud B 720 may have an available Rx time 722 to listen for the ACK Tx packet from the audio bud C 730. Specifically, whenever the audio bud C 730 successfully receives that source packet 711, the audio bud C 730 may send a short private Tx ACK to the audio bud B 720 immediately following the A→B transmission. However, in this scenario, if the audio bud B 720 does not receive the private ACK from audio bud C 730 within the designated Rx time 722 after the transmission of the Tx source packet 711 from the source device A 710, the audio bud B 720 may presume that the audio bud C 730 failed to receive the packet 711. Accordingly, the audio bud B 720 may relay the source packet 711 during a B2B Tx 723 to the audio bud C 730.

According to one exemplary embodiment, for the relay transmission, the audio bud B 720 may utilize a shorter data packet for the B2B Tx 723, which may have a higher rate. For example, as described above, since the relationship between the audio buds 720 and 730 should be relatively stable (e.g., a relatively constant physical separation, similar interference sources, etc.), the B2B link between the audio buds 720 and 730 may support a higher data rate than the S2B link. Thus, the same amount of data may be transmitted in a shorter time over the B2B link than the amount of time it would take over the S2B link. However, it is noted that it is not required that the B2B link has a higher data rate than the S2B link.

Upon successfully receiving the relay B2B Tx 723 during a listen/receive Rx time 732, the audio bud C 730 may respond with a private ACK Tx 733. The audio bud B 720 may listen/receive for the ACK Tx 733 during Rx time 724. If the audio bud B 720 receives the ACK Tx 733 during the Rx time 724, the audio bud B 720 may send a Tx ACK 725 to the source device A 710 during the next the Rx slot 744 (after tuning back to the S2B piconet). Otherwise, if the audio bud C 730 does not successfully receive the relay packet Tx 723, the audio bud B 720 may transmit a NACK (Tx NACK 726) to the source device 710 during the Rx slot 744. Accordingly, the source device A 710 may have an available listen/receiver time 712 for such ACK/NACK communications from the audio bud B 720.

In FIG. 8, only the wireless audio bud C 830 successfully received the source packet from the source device A 810 while the audio bud B 820 failed to receive the packet from the source device A 810 (e.g., due to a bad link). Once again, both audio buds B 820 and C 830 may tune to the S2B piconet during the source Tx slot 842 and listen/receive a Tx source packet 811, however the audio bud C 830 during Rx time 831 successfully receives the packet 811 while the audio bud B 820 during Rx time 821 fails to receive the packet 811. Similar to the scenarios discussed above, after the Rx times 821 and 831, the audio buds 820 and 830 may tune to the B2B piconet wherein the audio bud B 820 may have an available Rx time 822 to listen/receive an ACK Tx packet 832 from the audio bud C 830. If the audio bud B 820 receives the ACK Tx packet 832 without previously receiving the Tx source packet 811, the audio bud B 820 will be aware that a source packet transmission has been missed at the audio bud B 820.

In this scenario 800, the audio bud C 830 successfully receives the source packet 811 (S2B communication) and sends the short private Tx ACK 832 (B2B communication) to the audio bud B 820. However, since the audio bud B 820 did not receive the referenced source packet transmission, the audio bud B 820 may send a short private POLL packet 823 to the audio bud C 830 requesting a relay transmission of the packet 811. After the audio bud C 830 sends the ACK Tx packet 832 to the audio bud B 820, the audio bud C 830 may listen for such a private POLL packet for a short period during the Rx time 833. If the audio bud C 830 receives the short private POLL Tx 823 from the audio bud A 820, then the audio bud C 830 may relay the source packet 811 to the audio bud B 820 during a B2B Tx 834.

Upon successfully receiving the relay B2B Tx 834 during a listen/receive Rx 824, the audio bud B 820 may send a Tx ACK 825 to the source device A 810 at the next Rx slot 844 in the S2B communication. Otherwise, if the audio bud B 820 does not successfully receive the relay packet Tx 834, the audio bud B 820 may transmit a NACK (Tx NACK) to the source device 810 during the Rx slot 844. Accordingly, the source device A 810 may have an available listen/receive time 812 for such ACK/NACK communications from the audio bud B 820.

In FIG. 9, neither of the wireless audio buds B 920 nor C 930 received the source packet 611 from the source device A 910 (e.g., due to bad links). While both audio buds B 920 and C 930 may tune to the S2B piconet during the source Tx slot 942 and listen for a Tx source packet 911, both the audio bud 920 and 930 during Rx time 921 and 931, respectively, fail to receive the packet 911. Once again, the audio bud B 920 may have an available Rx time 922 to listen for an ACK Tx packet from the audio bud C 930. Likewise, the audio bud C 930 may have an available Rx time 932 to listen for a private POLL packet Tx from the audio bud B 920. However, due to the S2B transmission failure at both the audio buds B 920 and C 930, neither of the audio buds 920 or 930 will receive any S2B or B2B transmissions. In other words, the audio bud B 920 does not successfully receive the source data packet 911 from the source device A 910 nor any private ACK transmissions from the audio bud C 930. In this scenario 900, the audio bud B 920 may transmit a NACK (Tx NACK) 923 to the source device 910 during the Rx slot 944 of the S2B communication. Accordingly, the source device A 910 may have an available listen/receive time 912 for such ACK/NACK communications from the audio bud B 920.

During each of the various scenarios depicted in FIGS. 6-9, additional embodiments may allow for the implementation of more aggressive relay schemes. For instance, these aggressive relay schemes may reduce or remove the private ACK and POLL overhead, and thus increase the maximum payload size for real-time relay transmissions. For example, whichever of the sink devices successfully receives the source packet may relay broadcast the source data immediately following the source Tx. Therefore, any sink devices that fail to receive the source packet may receive the packet from the relay broadcast opportunity.

With respect to the maximum supported source payload and feedback to the source device A, the exemplary embodiments may allow for the determination of such payload size for real-time relay transmissions. FIG. 10 shows an exemplary table 1000 for real-time relay supported maximum Bluetooth source packet payload sizes based on link rates and slot length for the source Tx. It is noted that the exemplary table 1000 is for illustrative purposes for any of the various embodiments described herein and is not intended to limit the determination of payload size or feedback to any specific scheme or implementation. For example, a primary sink device B may transmit to a secondary sink device C a real-time relay having a payload of up to 365 bytes per Bluetooth packet using a transmission rate of 3 Mbps if the source device A uses 5 slots and a 2 Mbps transmission rate.

Furthermore, based on the source TX slot length and the supported link rates (e.g., S2B and B2B), the primary sink B may provide feedback to the source device A to limit the source packet frame length and/or request extended Tx slots for use during relay transmissions. For instance, the source packet frame length may be limited by reducing the source data amount (e.g., using a lower encoder rate), fragmentation with smaller packets, using higher transmission rates, etc. The source device A may reserve extended Tx slots (e.g., up to 5 slots) although source packets may occupy only, e.g., 1 or 3 slots. Accordingly, the remaining time in the Tx slot may be used for the real-time relay systems and methods described herein.

Figure 11:
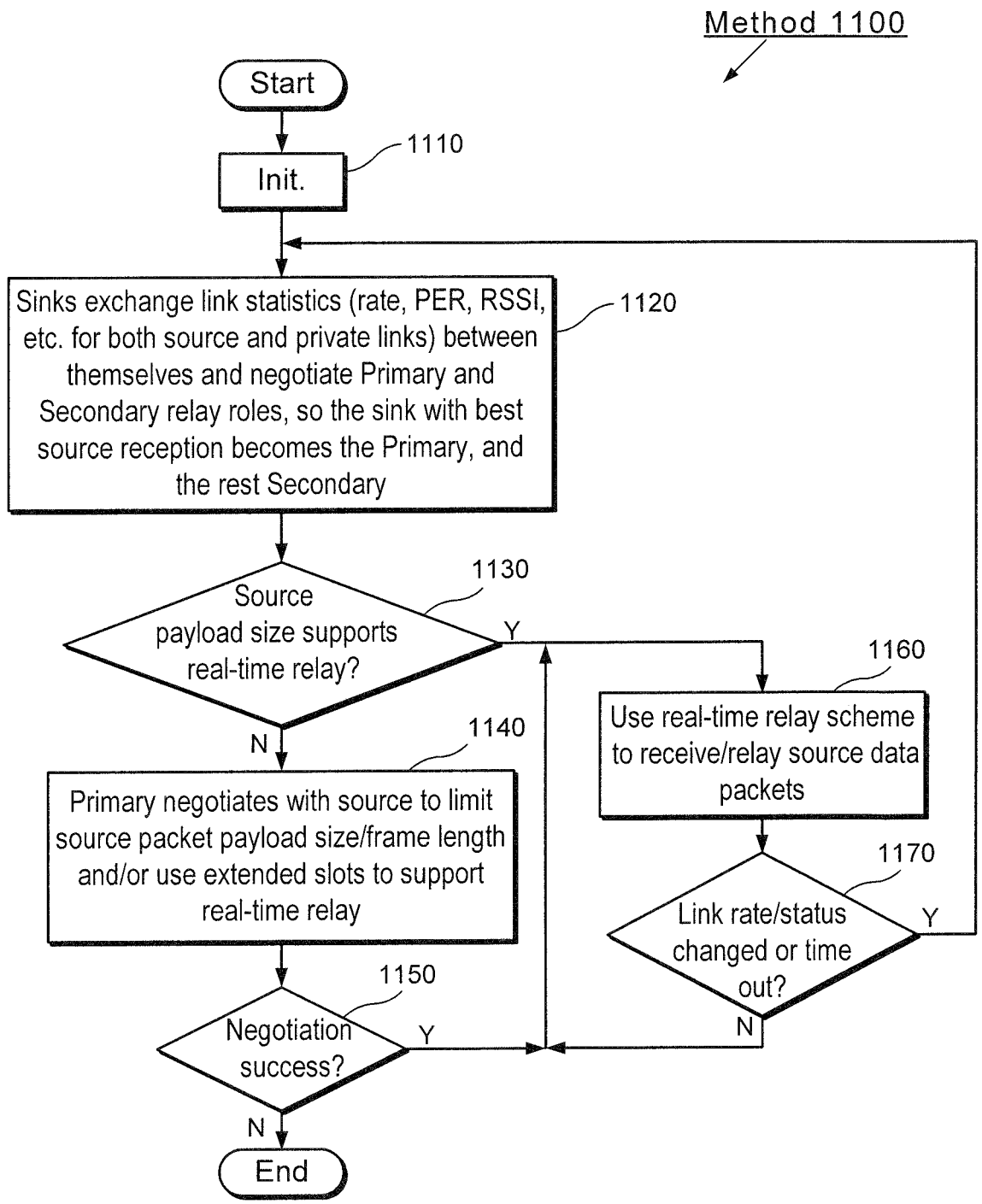
FIG. 11 shows an exemplary method for providing real-time relay of wireless communications according to various embodiments described herein.

FIG. 11 shows an exemplary method 1100 for a providing real-time relay of wireless communications according to various embodiments described herein. The method 1100 will be described with reference to the scatternet including a first piconet having the source device (as a master) and a primary audio sink (as a slave) and a second piconet having the primary audio sink (as a master) and secondary audio sink (as a slave). Each of the primary audio sink and the secondary audio sink may perform the operations of method 1100. Furthermore, the source device may refer to any of the above-reference source devices A; the primary audio sink may refer to any of the above-referenced primary audio buds B; and the secondary audio sink may refer to any of the above-reference secondary audio buds C.

In 1110, each of the network components (e.g., source device and sink devices) may be configured for wireless communications. This configuration may include, for example, establishing transmission slots and reception slots for S2B and B2B communications. In 1120, a primary relay role may be designated for one of the sink devices. For instance, each of the sink devices may exchange link statistics, such as any/all of a rate, RSSI, PER, etc., for either or both the S2B piconet links and the B2B piconet links. Based on the statistical information exchange, the sink devices may negotiate the primary and secondary relay roles such that the sink having the best source reception may become the primary sink device. The remaining sink device(s) may then be designated as the secondary sink device(s).

In 1130, it may be determined whether the source payload size of a source Tx packet will support a real-time relay. Specifically, the table 1000 may be utilized as a look-up table based on the various parameters of the source device transmission. If the source payload size supports real-time relay, the method 1100 may advance to 1160. If the source payload size does not support real-time relay transmissions, the method 1100 may advance to 1140.

In 1140, the primary sink device may negotiate with the source device to enable the transmission to allow for real-time relays. For instance, the primary sink device may request that the source device limit the source packet payload size and/or frame length. Additionally or alternatively, the primary sink device may request that the source device use extended slots to support real-time relaying.

In 1150, it may be determined whether the negotiations between the primary sink device and the source device were successful. If the negotiations were not successful, the method 1100 may terminate. If the negotiations were successful, the method 1100 may advance to 1160 (or to 1130 for re-evaluation).

In 1160, the primary sink device may implement any of the various real-time relay schemes to receive and/or relay source data packets to/from the secondary sink device(s). As detailed above in FIGS. 6-9, various scenarios may include both the primary and secondary devices receiving the source packet, only one of the primary and secondary devices receiving the source packet, neither the primary nor the secondary devices receiving the source packet, etc.

In 1170, it may be determined whether any of the S2B transmission parameters have changed or timed out. For instance, the change in parameters may include a change in the link rate or status. Such a change or a transmission time out may require any subsequent transmissions to be evaluated for the capability to support real-time relay transmissions. Accordingly, if there is a change in the link rate/status or a time out, the method 1100 may loop back to 1120 wherein the primary and secondary roles may be reassessed and possibly re-designated. If there were no changes to the link, the method 1100 may loop back to 1160, wherein the real-time relay schemes may continue to be implemented during future S2B transmissions.

Bi-Lateral Relay Opportunity of Wireless Communications

The exemplary embodiments described above relate to an optimization of available time or slots in utilizing the B2B piconet 104 for a relay mechanism. Specifically, the relay mechanism involves data received by one of the audio buds 108, 110 being transmitted to the other audio bud that failed to receive the data from the source device 106. Accordingly, the exemplary embodiments described above and described herein are directed to issues arising from interference or other problems that cause at least one of the audio buds 108, 110 to not receive data packet transmissions from the source device 106. As will be described in further detail below, the above described relay mechanism may be modified to incorporate features and include various transmission operations between the source device 106, the primary audio bud 108, and the secondary audio bud 110.

Initially, prior to any use of the relay mechanism, the source device 106 and the audio buds 108, 110 may utilize a retransmission mechanism. The retransmission mechanism may be utilized when a previous attempt at receiving a data transmission from the source device 106 fails. Under various short range communication protocols such as BlueTooth, a communication between BlueTooth nodes (e.g., the source device 106 and the audio buds 108, 110) is generally protected via the retransmission mechanism. The retransmission mechanism entails a receiving node (e.g., the primary audio bud 108) sending a response such as an ACK, a NACK, or nothing to the transmitting node (e.g., the source device 106) to confirm that the data was received, to indicate that the data was not received, or to time out when the receiving node is not aware of a transmission, respectively. If the data being transmitted or the response is lost (e.g., collision with interference, insufficient signal levels, scheduling conflicts between various BlueTooth uses, etc.), the transmitting node may re-transmit the data. In practice, there may be a limit on a number of retransmissions or a maximum time duration over which retransmissions are allowed to maintain a certain user experience. Such a protocol of limiting the number of retransmissions is described below. However, it is noted that there may be other uses where there is no limit or maximum time in which retransmissions may be attempted.

Figure 12:
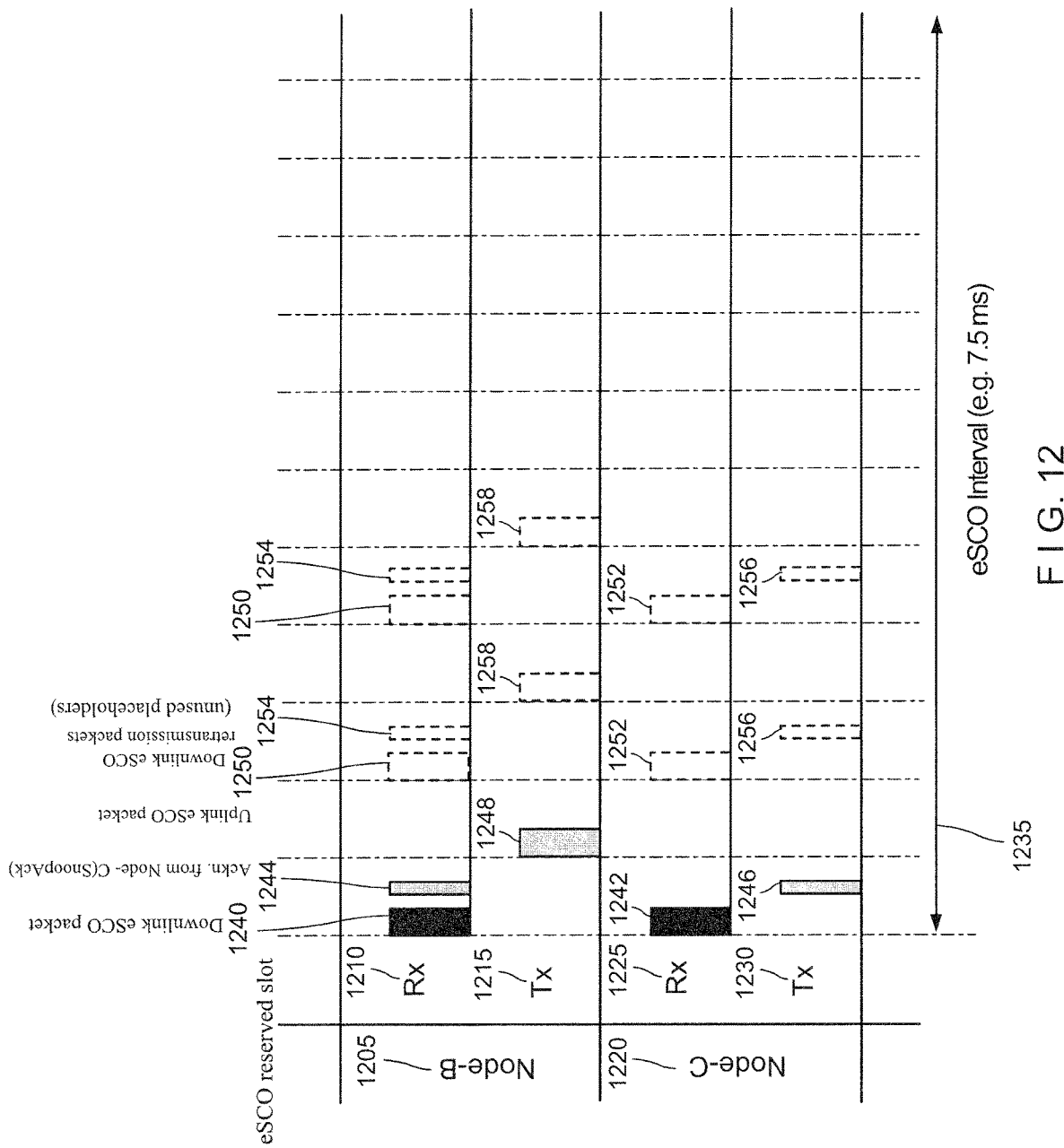
FIG. 12 shows a first retransmission scheme from a source device A to the two audio buds B and C over the S2B piconet according to various embodiments described herein.
Figure 13:
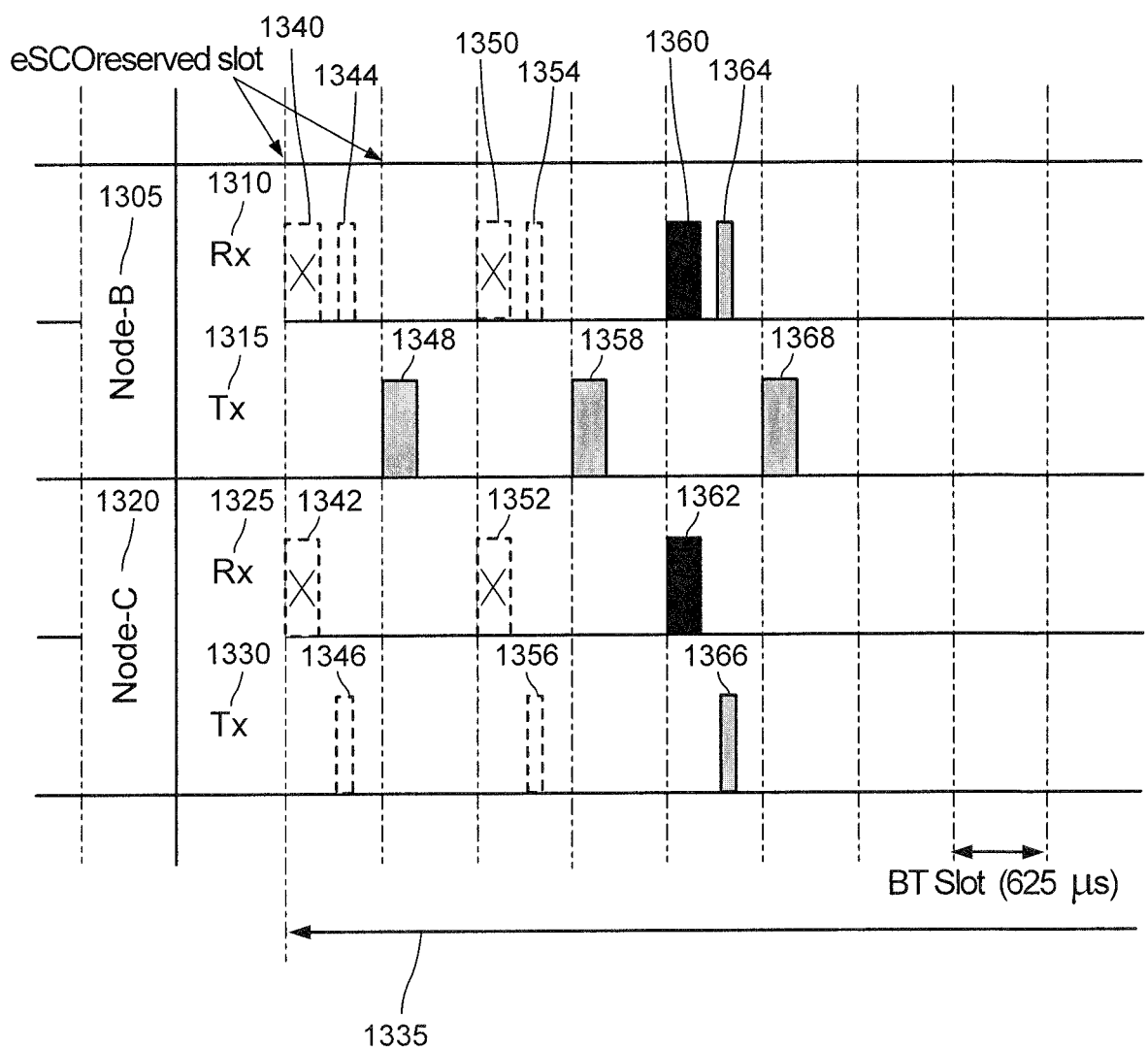
FIG. 13 shows a second retransmission scheme from a source device A to the two audio buds B and C over the S2B piconet according to various embodiments described herein.

FIG. 12 shows a first retransmission scheme from a source device A to the two audio buds B and C over the S2B piconet according to various exemplary embodiments described herein. Specifically, the first retransmission scheme illustrates how the retransmission mechanism may potentially be utilized and available within an interval. FIG. 13 shows a second retransmission scheme from a source device A to the two audio buds B and C over the S2B piconet according to various exemplary embodiments described herein. Specifically, the second retransmission scheme illustrates how the retransmission mechanism is used within the interval. It is noted that the first and second retransmission schemes result in both audio buds 108, 110 successfully receiving a data packet from the source device 106 within a portion of a scheduling interval used for transmissions over the S2B piconet 102. Accordingly, the first and second retransmission schemes may include a result substantially similar to scenario 600 of FIG. 6.

Initially, it is noted that the retransmission schemes of FIGS. 12-13 and the description herein for the relay mechanism are shown with regard to an extended Synchronous Connected Oriented (eSCO) link. However, the use of the eSCO is only exemplary. As will be described in detail below, the exemplary embodiments may be modified to be used with other link types such as an Asynchronous Connection-less Link (ACL).

As those skilled in the art will understand, the eSCO may be used for real-time, latency-sensitive traffic such as voice where data is exchanged on fixed, regular intervals. The eSCO is a special form of a Synchronous Connected Oriented (SCO) link and allows a limited number of retransmission attempts prior to declaring a lost packet or failed data transmission (from the perspective of the source device 106). A packet carrying synchronous audio data transmitted with the eSCO link is scheduled at regular intervals such as every 12 slots or 7.5 ms (where one slot is 625 µs). The SCO link has one packet exchange in SCO reserved slots whereas eSCO has one packet exchanged in eSCO reserved slots followed by one or more retransmissions if needed (e.g., two retransmission attempts). If retransmissions are not needed, the retransmission slots may be used for other traffic in a substantially similar manner as described above in optimizing slot usage. The exemplary embodiments are described with regard to having two retransmission attempts available. However, those skilled in the art will understand that the exemplary embodiments may utilize any number of retransmission attempts (e.g., so long as the attempts may be performed within the interval).

Returning to the retransmission scheme of FIG. 12, the primary audio bud 108 is represented by Node-B 1205 while the secondary audio bud 110 is represented by Node-C 1220. The Node-B 1205 may include a reception period 1210 and a transmission period 1215 while the Node-C 1220 may include a reception period 1225 and a transmission period 1230. Again, with the eSCO link, an interval 1235 may be 7.5 ms long with 12 slots included therein.

In the interval 1235 of FIG. 12, the packet exchange may entail a transmission from the source device 106. The Node-B 1205 and the Node-C 1220 may be tuned to the S2B piconet 102 and transition to a receiving period (corresponding to the reception period 1210 and 1225, respectively). Accordingly, the Node-B 1205 may receive data 1240 from the source device 106 while the Node-C 1220 may receive data 1242 from the source device 106. It should be understood that data 1240 and data 1242 are the same data (e.g., same data packet transmitted by the source device 106), but are shown with difference reference numerals to signify the data has been received by different devices. Once the data 1242 is received by the Node-C 1220, during an IFS thereafter, the Node-C 1220 may remain tuned to the S2B piconet 102 but transition to a transmitting period (corresponding to the transmission period 1230). Since the Node-C 1220 has successfully received the data 1242, the Node-C 1220 may transmit an ACK 1246 over the S2B piconet to the Node-B 1205 that remains tuned to the S2B piconet 102 and remains in the receiving period. Thus, the Node-B 1205 receives the ACK 1244 from the Node-C 1220. The above operations may all be performed within the first slot of the interval 1235. It is noted that although the ACK 1244, 1246 is a data exchange between the Node-B 1205 and the Node-C 1220, this data exchange may be transmitted over the S2B piconet 102 to, for example, conserve battery power by eliminating a need to tune to the B2B piconet 104. However, the use of the S2B piconet 102 is only exemplary and this ACK data exchange between the Node-B 1205 and the Node-C 1220 may be performed over the B2B piconet 104.

Once the Node-B 1205 has received the ACK 1244 from the Node-C 1220, the Node-B may remain tuned to the S2B piconet 102 and transition to a transmitting period (corresponding to the transmission period 1215). The Node-B 1205 may then transmit an uplink eSCO packet 1248 which includes an ACK to the source device 106 that the data transmission has been received (by the Node-B 1205 and impliedly the Node-C 1220). The above operations may all be performed within the second slot of the interval 1235. The uplink eSCO packet 1248 also indicates to the source device 106 that no retransmission is necessary. Thus, retransmission opportunities 1250, 1252 (data retransmissions from source device 106) along with the corresponding response opportunities 1254 (ACK/NACK from Node-C 1220), 1256 (ACK/NACK received by Node-B 1205), 1258 (ACK/NACK to source device 106) are not necessary. It is noted that the use of the ACK and NACK in the eSCO packet 1248 and use of the ACK and NACK for the exemplary embodiments described herein are only exemplary. The ACK and the NACK may represent any first and second indication corresponding to the information to be conveyed to the receiving device.

Returning to the retransmission scheme of FIG. 13, a substantially similar configuration may be used in which the primary audio bud 108 may be represented with Node-B 1305 while the secondary audio bud 110 may be represented with Node-C 1320. The Node-B 1305 may include a reception period 1310 and a transmission period 1315 while the Node-C 1320 may include a reception period 1325 and a transmission period 1330. With the eSCO link, an interval 1335 may be 7.5 ms long with 12 slots included therein. In contrast to the retransmission scheme of FIG. 12, the retransmission scheme of FIG. 13 illustrates how the retransmission mechanism may be used as an opportunity to re-attempt data transmissions when one or more previous attempts fail. As noted above, the retransmission scheme of FIGS. 12 and 13 may include two available retransmission attempts. With each forward transmission (from the source device 106) occupying one slot, each backward transmission (to the source device 106) occupying one slot, and three total attempts (an initial attempt and up to two retransmission attempts), a total of six slots of the twelve total slots in the interval 1335 may be used in the data exchange with the source device 106. It is noted that the Node-B 1305 and the Node-C 1320 may use the appropriate IFS for proper configuration in the reception period 1310, 1325/transmission period 1315, 1330 on the S2B piconet 102 for the following description.

In the interval 1335 of FIG. 13, the initial transmission attempt 1340 (to the Node-B 1305), 1342 (to the Node-C 1320) may fail. It is noted that the retransmission scheme of FIG. 13 illustrates when both of the Node-B 1305 and the Node-C 1320 fail to receive the data transmission. However, for the retransmission scheme to be used, only one of the nodes may fail to receive the data transmission. Thus, the retransmission scheme may also be used where one of the nodes receive the data transmission while the other fails. When the Node-C 1320 fails to receive the data transmission 1342 and is unaware that the source device 106 even attempted the data transmission, the ACK exchange opportunity 1344, 1346 between the nodes is not performed. However, if the Node-C 1320 is aware of the data transmission and fails to receive the data transmission, the Node-C 1320 may use the ACK exchange opportunity 1346 to transmit a NACK to be received in the ACK exchange opportunity 1344 of the Node-B 1305. With one or both of the Node-B 1305 and the Node-C 1320 failing to receive the data transmission, the Node-B 1305 may transmit a NACK in an uplink eSCO packet 1348.

As shown in the retransmission scheme of FIG. 13, since the source device 106 receives a NACK from the Node-B 1305 in the uplink eSCO packet 1348, the source device 106 may perform a first retransmission attempt. It is noted that if the Node-B 1305 and the Node-C 1320 were to be incapable of even acknowledging the data transmission, the Node-B 1305 may not have transmitted the uplink eSCO packet 1348. However, the source device 106 may have a time out condition after transmitting the data and waiting for a response of an ACK/NACK. With no response (either from the Node-B 1305 not transmitting a response or the response getting lost), the source device 106 may still be aware that the first retransmission attempt is needed due to the time out condition.

In the scenario shown in the retransmission scheme of FIG. 13, the source device 106 receives the uplink eSCO packet 1348. Accordingly, the source device 106 may utilize the first retransmission attempt. However, as shown, the first retransmission attempt may also fail as one or both of the Node-B 1305 and the Node-C 1320 may not receive the data transmission from the source device 106. Thus, the forward transmission opportunity 1350, 1352 may fail resulting in the node exchange opportunity 1354, 1356 not being used or for a NACK exchange (or even an ACK exchange if the Node-C 1320 successfully receives the data transmission but the Node-B 1305 fails to receive the data transmission). Thereafter, the Node-B 1305 may transmit another uplink eSCO packet 1358 including a NACK.

With a second NACK for the data transmission, the source device 106 may determine that there is still one more retransmission attempt. As shown, the second retransmission attempt results in a successful reception of the data transmission from the source device 106 by the Node-B 1305 and the Node-C 1320. Thus, the Node-B 1305 may receive the data 1360 while the Node-C 1320 may receive the data 1362. The Node-C 1320 may transmit an ACK 1366 over the S2B piconet to the Node-B 1305. The Node-B 1305 receives the ACK 1364 from the Node-C 1320. Once the Node-B 1305 has received the ACK 1364 from the Node-C 1320, the Node-B may then transmit an uplink eSCO packet 1368 which includes an ACK to the source device 106 that the data transmission has been received (by the Node-B 1305 and impliedly the Node-C 1320). It is noted that the first retransmission attempt may have been successful instead of the second retransmission attempt.

Accordingly, the above operation illustrates how the retransmission mechanism provides a failsafe operation to increase a likelihood that the primary audio bud 108 and the secondary audio bud 110 has received the data transmission from the source device 106. However, there are still various conditions and interference issues that may arise such that the retransmission mechanism is not successful. For example, the interference issues may involve fading and/or frequency hopping as used in BlueTooth. It is noted that fading and frequency hopping are only exemplary. As those skilled in the art will understand, there are any number of interference scenarios that exist in which one of the audio buds may receive the data from the source device 106 while the other one of the audio buds does not.

Figure 14:
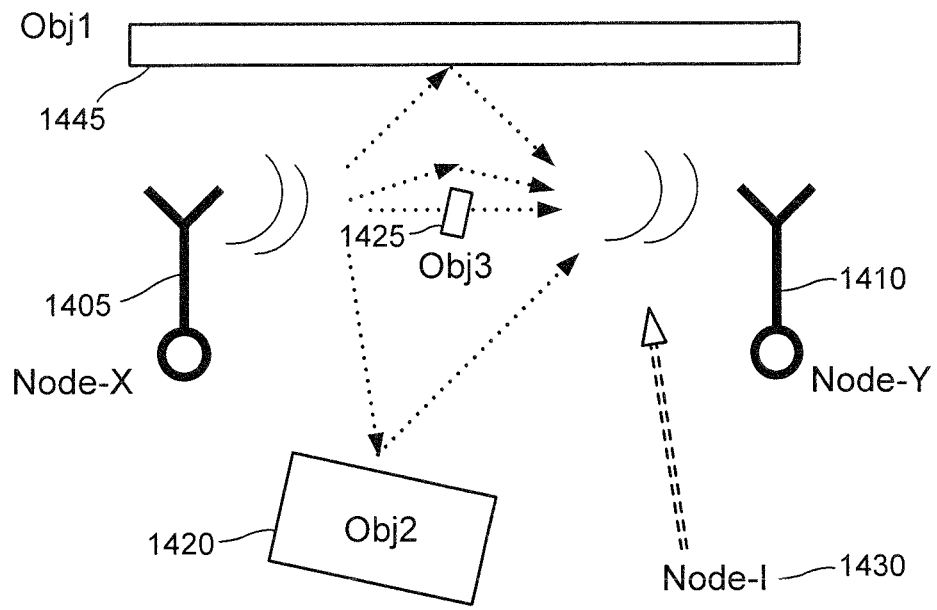
FIG. 14 shows an exemplary scenario where interference occurs for data transmissions between devices according to various embodiments described herein.

FIG. 14 shows an exemplary scenario where interference occurs for data transmissions between devices according to various embodiments described herein. As illustrated, there may be a first node 1405 and a second node 1410 using a BlueTooth connection or piconet (e.g., S2B piconet 102). The first node 1405 may be, for example, the source device 106 while the second node 1410 may be, for example, the primary audio bud 108. Accordingly, the first node 1405 may be transmitting a signal to the second node 1410. In the path of transmission, the electromagnetic waves emitted by the first node 1405 may encounter various objects in the environment. For example, as illustrated in FIG. 14, some of the electromagnetic waves from the first node 1405 may follow propagation paths that reflect off of nearby ceilings or walls such as a first object 1415 and a second object 1420. Although the first node 1405 and the second node 1410 may be oriented with no obstacles therebetween to block a direct line of sight, the presence of obstacles in the line of sight such as a third object 1425 may cause some electromagnetic waves to travel through the object via refraction (thereby experiencing various degrees of attenuation) or travel around the object via diffraction (e.g., creeping waves).

Figure 15:
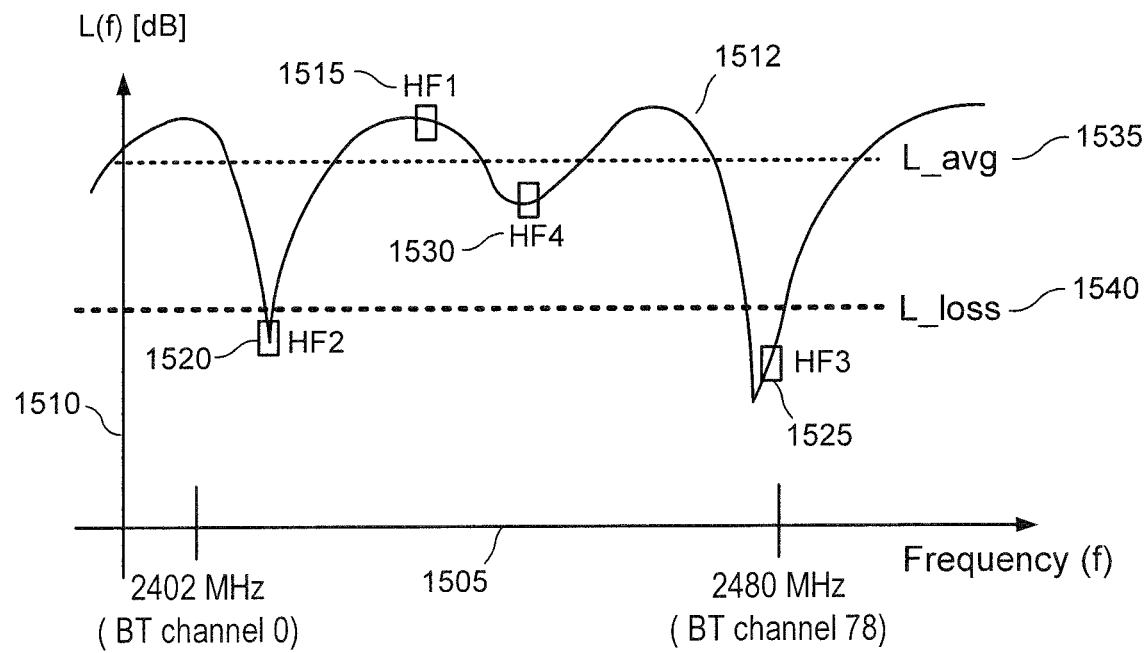
FIG. 15 shows an exemplary spectral fading curve over a set of frequencies for a single audio bud according to various embodiments described herein.

The overall resulting signal from the first node 1405 to the second node 1410 may be a superposition of these electromagnetic waves that each experience a variety of propagation delays based on the different geometrical paths that are taken to reach the destination at the second node 1410. Those skilled in the art will understand that, owing to field superposition phenomena inherent to electromagnetic waves, constructive and destructive interference of the electromagnetic waves cause different parts of the electromagnetic spectrum to show more or less pronounced degrees of signal fading. FIG. 15 shows an exemplary spectral fading curve over a set of frequencies for a single audio bud according to various embodiments described herein. Specifically, FIG. 15 shows a part of the spectrum that is used for BlueTooth signaling with carrier frequencies between 2402 MHz and 2480 MHz representing channels 0 to 78 as shown on a first axis 1505. As those skilled in the art will understand, a traditional BlueTooth channel occupies a bandwidth of 1 MHz to transmit a given packet in a given time-slot. The spectral fading curve of FIG. 15 is also with regard to a signal quality measured in dB as shown on a second axis 1510. Thus, the curve 1512 represents a link strength (e.g., a link level or amplitude) versus a carrier frequency at a given time. In light of a time-variance in the channel from any movement among the first node 1405, the second node 1410, and the objects 1415, 1420, 1425, the curve 1512 follows this time-variance so that fades and/or frequencies of strong signals vary over the spectrum. As those skilled in the art will understand, a pedestrian or use of the nodes in a stationary area (e.g., indoor use) may result in a channel that is quasi-static over a small number of milliseconds but may change substantially over 10's or 100's of milliseconds.

The curve 1512 also illustrates how the BlueTooth protocol uses a signaling bandwidth of 1 MHz and is a narrowband system. A communication between the node 1405 and the node 1410 hops from a 1 MHz channel to another 1 MHz channel for subsequent packet transmissions. For example, there may be a plurality of packet transmissions at a first hopping frequency (HF) 1515, a second HF 1520, a third HF 1525, and a fourth HF 1530. The HFs 1515-1530 may have an average signal quality 1535. A subset of all of the frequencies in the spectrum may be used in a given BlueTooth link. However, if a given hop falls below a minimum signal quality level or a loss level 1540 corresponding to a receiver sensitivity of the node 1410, the transmission may be lost. As noted above, the propagation of the electromagnetic waves experiencing the various conditions from the objects may result in the hop falling below the loss level 1540, such as with HF 1520 and HF 1525 (whereas HF 1515 and HF 1530 are above the loss level 1540).

The scenario illustrated in FIG. 14 also shows another reason that may cause or contribute to a packet loss from wireless interference from other devices such as a third node 1430. The third node 1430 may be capable of wireless transmissions and utilize a frequency that is within, neighboring, or otherwise interferes with the spectrum of frequencies used by the node 1405 and the node 1410. Both the desired signal from the node 1405 to the node 1410 and the interference from the node 1430 to the node 1410 typically experience interference. Success and failure of the packet transmission may therefore depend on the signal to noise and interference ratio (SINR) that is present during a given wireless packet transmission.

The BlueTooth protocol uses frequency hopping (e.g., from HF 1515 to HF 1520 to HF 1525 and to HF 1530) to protect against the above noted interference and fading artifacts. For example, if a transmission in a given time slot or a during a hop is lost (e.g., HF 1520 or HF 1525), the retransmission mechanism described above may utilize different frequencies to provide diversity as other frequencies with a good signal level may typically yield success (e.g., HF 1515 or HF 1530).

The above description of fading, frequency hopping, and interference relates to the source device 106 transmitting data to only one of the audio buds 108, 110. Specifically, the curve 1512 may be for receiving data transmissions by only the primary audio bud 108. However, in the context of the fading phenomena, there is a further potential vulnerability when introducing another node such as the three node system described above in the scatternet 100 in which the source device 106 is transmitting data that is being received by both the primary audio bud 108 and the secondary audio bud 110. Again, the source device 106 and the primary audio bud 108 may be connected via the S2B piconet 102 and the secondary audio bud 108 may eavesdrop and listen for communications from the source device 106. With both the primary audio bud 108 and the secondary audio bud 110 having to receive data from the source device 106, the interference issue may become compounded.

The link from the source device 106 to the primary audio bud 108 may suffer from a statistically independent fading phenomena than the eavesdropping between the source device 106 and the secondary audio bud 110. In general, successful transmissions from the source device 106 to both the primary audio bud 108 and the secondary audio bud 110 are intended. However, since both the links may suffer from a fade, probabilities to lose a data transmission experienced by either of the audio buds 108, 110 increase. In fact, studies indicate that a missing data transmission on only one of the audio buds 108, 110 may create a more unsatisfactory experience then when both of the audio buds miss a data transmission. Users have indicated that audio absent on only one audio bud is more noticeable than when audio is absent on both audio buds.

FIG. 16 shows a first exemplary spectral fading curve over a set of frequencies for two audio buds B and C according to various embodiments described herein. In the spectral fading curves shown in FIG. 16, it becomes apparent how the system of three nodes has a compounded interference issue. The spectrum of frequencies is shown in the first axis 1605 with the signal strength shown in the second axis 1610. Data transmissions associated with the primary audio bud 108 may be represented with a first curve 1615 while data transmissions associated with the second audio bud 110 may be represented with a second curve 1640. The first curve 1615 may include a plurality of frequencies upon which a data transmission is attempted such as HF 1620, HF 1625, HF 1630, and HF 1635. The second curve 1640 may include a plurality of frequencies upon which a data transmission is attempted such as HF 1645, HF 1650, HF 1655, and HF 1660 (at corresponding times as the first curve 1615).

As illustrated, introducing a further node (e.g., the secondary audio bud 110) that receives data from the source device 106 to generate an overall audio experience for a user results in an increased likelihood that a data transmission may be lost from at least one of the receiving nodes. In considering only the primary audio bud 108 via the first curve 1615, there are 2 instances when the curve 1615 drops below a loss level 1665 (at HF 1625 and HF 1630). In considering only the secondary audio bud 110 via the second curve 1640, there are 3 instances when the curve 1640 drops below the loss level 1665 (at HF 1660, at an instance between HF 1645 and HF 1650, and at a further instance after HF 1655). Therefore, on an individual level, the primary audio bud 108 has 2 instances of data transmission failure while the secondary audio bud 110 has 3 instances of data transmission failure. However, with a three node system, there are now five total spectral regions that suffer from deep fades where at least one of the audio buds is likely to fail to not receive the data transmission from the source device 106. Although the above retransmission mechanism may still be capable of recovering any lost data transmissions at either the primary audio bud 108 or the secondary audio bud 110 (using frequency diversity through hopping to different frequencies), the phenomenon of higher fading probability puts a three node system with the existing UTP protocol at an inherent statistical disadvantage.

In fact, the inherent disadvantage is more pronounced in an imbalanced scenario. FIG. 17 shows a second exemplary spectral fading curve over a set of frequencies for two audio buds B and C according to various embodiments described herein. The spectrum of frequencies is shown in the first axis 1705 with the signal strength shown in the second axis 1710. Data transmissions associated with the primary audio bud 108 may be represented with a first curve 1715 having an average signal quality 1720 while data transmissions associated with the second audio bud 110 may be represented with a second curve 1725 having an average signal quality 1730.

In contrast to the curves 1615 and 1640 of FIG. 16, the curves 1715 and 1725 have a much greater difference in the average signal qualities 1720 and 1730 with the average signal quality 1730 of the second curve 1725 being closer to a loss level 1735 (where data transmissions are likely to fail). Thus, the link from the source device 106 to the secondary audio bud 110 suffers from wider areas of spectrum whose signal levels fall below the loss level 1735. This imbalance may occur for a variety of reasons. For example, the secondary audio bud 110 may experience more pronounced shadowing with respect to the source device 106. In another example, the source device 106 may be located in a particular location (e.g., a user's pocket) that may have a more or less visible link to the primary audio bud 108 and/or the secondary audio bud 110. With this imbalance and since both the primary audio bud 108 and the secondary audio bud 110 are required to successfully receive data transmissions from the source device 106, the channel and the three node system is potentially always stressed by the weaker link in an imbalanced scenario.

In view of the above drawbacks of the manner in which data is transmitted from the source device 106 to the primary audio bud 108 and the secondary audio bud 110 and in view of how a failsafe retransmission mechanism may still fail due to various interference issues (particularly in a three node system), the exemplary embodiments address the scenario where only one of the audio buds 108, 110 successfully receives the data from the source device 106. When only one of the audio buds 108, 110 receives the data, the audio buds 108, 110 may utilize a relay mechanism in which the B2B piconet 104 is used to exchange the data from the audio bud that successfully received the data to the audio bud that did not receive the data. In this manner, both the primary audio bud 108 and the secondary audio bud 110 has an increased likelihood of receiving the data from the source device 106. The following description is directed to an exemplary manner in which the relay mechanism may be utilized.

The exemplary embodiments provide a beneficial enhancement to the UTP protocol that overcomes the fading vulnerability described above, particularly with three or more node systems. In fact, the exemplary embodiments are configured to turn the inherent fading phenomenon into an advantage. Using the relay mechanism as an additional failsafe operation in ensuring that both the primary audio bud 108 and the secondary audio bud 110 receive the data transmission from the source device 106, the relay mechanism provides both the primary audio bud 108 and the secondary audio bud 110 with a substantially higher probability of receiving a successful data transmission.

As noted above, the UTP link for a three node system effectively suffers from an addition of loss probabilities. That is, interference issues suffered by the primary audio bud 108 and the secondary audio bud 110 on an individual level are added to result in the interference issues suffered by the system. In contrast, as will be described in detail below, after adjustment to include the relay mechanism according to the exemplary embodiments, the likelihood of success is multiplicative and results in a substantial improvement of the average system performance.

To illustrate the above additive and multiplicative principles, an example is described herein regarding loss rates. The primary audio bud 108 may be assumed to have an average loss rate of 3% or 0.03 while the secondary audio bud 110 may be assumed to have an average loss rate of 5% or 0.05 due to, for example, a lower average link level. Based on the additive principle when only the retransmission mechanism is used in a three node system, the user experience may be dominated by a total loss rate of 8% (0.03+0.05). This neglects the infrequent losses occurring at the same time that may reduce this number but those skilled in the art will understand that the likelihood of this occurrence is minimal. If the residual aggregative packet loss that is acceptable for the user experience is set to 4%, the resulting loss rate of 8% is unacceptable. However, through implementation of the relay mechanism with a robust relay performance, a loss only occurs if both the primary audio bud 108 and the secondary audio bud 110 lose or miss the transmission from the source device 106. With the above noted average loss rates, a simultaneous loss occurs with a multiplicative chance of 0.15% (0.03*0.05). Thus, using the relay mechanism improves from a very unacceptable loss of 8% to a very small loss rate of 0.15%. Aside from the actual data transmission improvement, the decrease of the loss rate due to the multiplicative nature of using the exemplary relay mechanism also results in a psychoacoustic improvement to the user experience. Specifically, the scenario of only one audio bud playing back audio is eliminated since any time that at least one audio bud receives the data transmission results in both audio buds receiving the data transmission via the relay mechanism.

The exemplary embodiments provide the relay mechanism over the B2B piconet 104 such that data received by one of the audio buds 108, 110 may be relayed (transmitted) to the other one of the audio buds 108, 110 that failed to receive the data. As will be described in further detail below, the relay mechanism over the B2B piconet 104 may also be used for a variety of other reasons. In a first example, the B2B piconet 104 may be used to share and maintain wireless network configuration parameters for the S2B piconet 102 (which may change from time to time) between the primary audio bud 108 and the secondary audio bud 110 to enable allowing the secondary audio bud 110 to reliably eavesdrop on all pertinent traffic over the S2B piconet 102. In a second example, the B2B piconet 104 may be used to synchronize and maintain synchronicity of audio channels between the primary audio bud 108 and the secondary audio bud 110. In a third example, the B2B piconet 104 may be used to adjust and manage the role of the primary audio bud 108 and the secondary audio bud 110 (which is primary and which is secondary) based on wireless link quality (perceived or anticipated), audio quality (perceived or anticipated), wireless coexistence with other protocols/links/devices, other sensing inputs that may be available (e.g., sound, acceleration, orientation, temperature, touch, pressure, light exposure, proximity to bodies/materials, biometric readings (heart rate), etc.).

Figure 18:
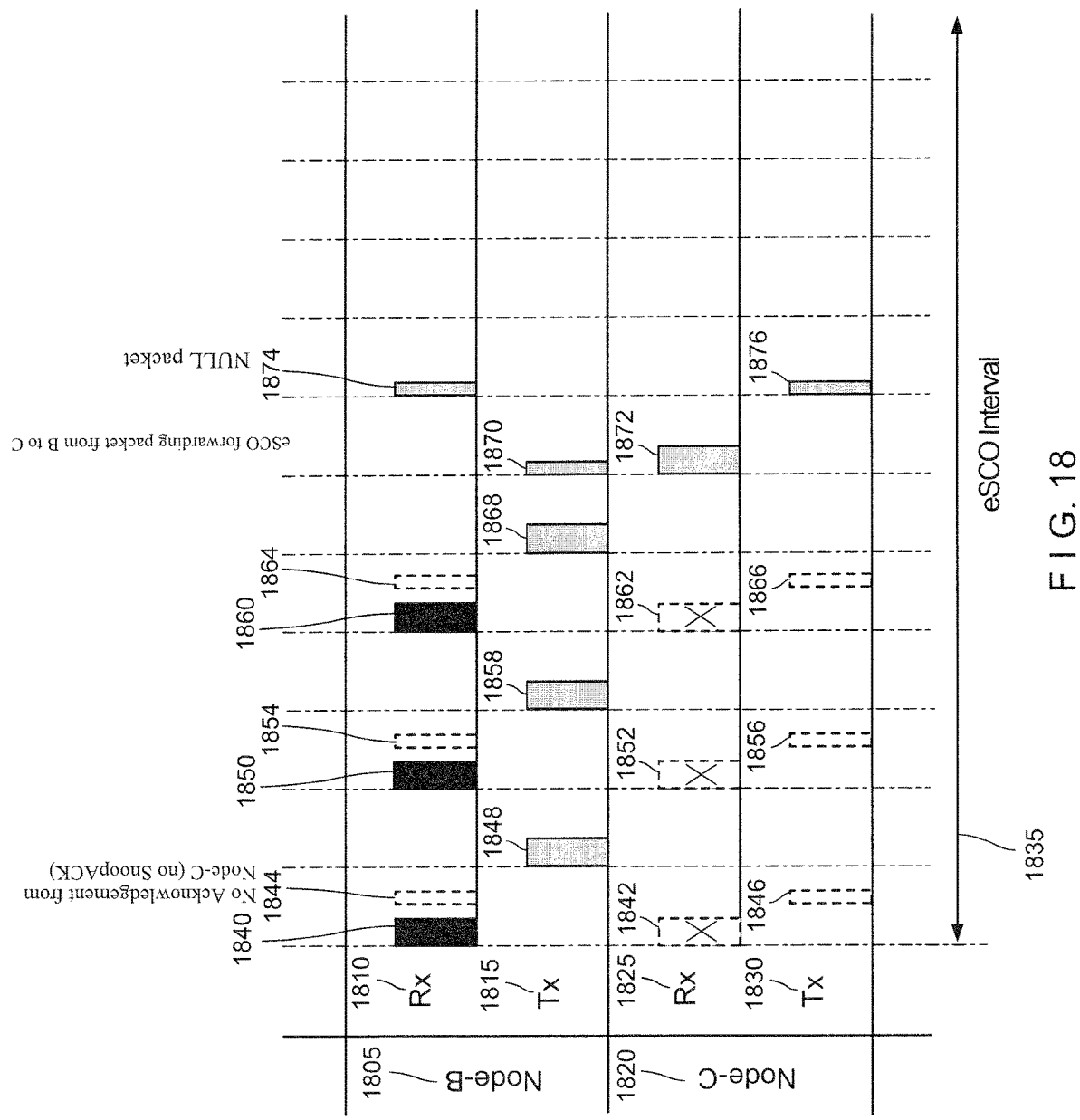
FIG. 18 shows a first private exchange scheme between the audio buds B and C over the B2B piconet according to various embodiments described herein.

FIG. 18 shows a first private exchange scheme between the audio buds B and C over the B2B piconet according to various embodiments described herein. Specifically, the first private exchange scheme between the primary audio bud 108 and the secondary audio bud 110 is when the primary audio bud 108 has successfully received the data transmission from the source device 106 while the secondary audio bud 110 has failed to receive the data transmission from the source device 106. In the first private exchange scheme, the primary audio bud 108 may be represented by the Node-B 1805 and the secondary audio bud 110 may be represented by the Node-C 1820. The Node-B 1805 may include a reception period 1810 and a transmission period 1815. The Node-C 1820 may include a reception period 1818 and a transmission period 1830. The first private exchange scheme may be performed over an interval 1835 which, as noted above, may be 7.5 ms and include 12 slots.

As illustrated, the first private exchange scheme may utilize substantially similar operations as the retransmission mechanism described above in FIGS. 12-13 for the first six slots of the interval 1835. Initially, the Node-B 1805 and the Node-C 1820 may be tuned to the S2B piconet prior to the start of the interval 1835. The Node-B 1805 and the Node-C 1820 may also transition to a receiving period corresponding to the reception period 1810, 1825, respectively prior to the start of the interval 1835. In this manner, the Node-B 1805 and the Node-C 1820 are prepared to receive the data transmission from the source device 106.

In an initial transmission attempt from the source device 106, the Node-B 1805 may receive data 1840 in the first slot. However, the Node-C 1820 may fail to receive data 1842 in the first slot. More specifically, the Node-C 1820 may not even be aware of the data transmission from the source device 106 despite eavesdropping on the S2B piconet 102. Accordingly, the Node-C 1820 may not transmit any response 1846. Therefore, the Node-B 1805 may not receive any response 1844. It is again noted that the Node-C 1820 may be aware of the data transmission but fails to successfully receive the data transmission. In such a scenario, the Node-C 1820 may transmit the response 1846 as a NACK and the Node-B 1820 may receive the response 1844 including the NACK. It is also again noted that the response 1844, 1846 may be transmitted over the S2B piconet 102. Therefore, the Node-C 1820 may transition to the transmission period 1830 after the IFS from missing the data 1842. Since the Node-B 1805 is already tuned to the S2B piconet 102 and transition to the reception period 1810, no additional operation is required by the Node-B 1805 for this data exchange with the Node-C 1820. After a time out period in which the response 1844 is not received by the Node-B 1805 or if the response 1844 includes a NACK, in the second slot, the Node-B 1805 remains tuned to the S2B piconet but transitions to the transmission period 1815 to transmit an uplink eSCO packet 1848 to the source device 106. In this instance, since only the Node-B 1805 has successfully received the data transmission, the uplink eSCO packet 1848 includes a NACK.

After the initial transmission attempt, in the third slot, a retransmission attempt is performed. In a substantially similar manner as the initial transmission attempt, the Node-B 1805 may successfully receive data 1850 but the Node-C 1820 may fail to receive data 1852. Accordingly, response 1854, 1856 may not be performed. Therefore, the uplink eSCO packet 1858 in the fourth slot may include a NACK.

After the first retransmission attempt is performed, in the fifth slot, a second retransmission attempt is performed. Again, the Node-B 1805 may successfully receive data 1860 but the Node-C 1820 may fail to receive data 1862. Accordingly, response 1864, 1866 may not be performed. Therefore, the uplink eSCO packet 1868 in the sixth slot may include a NACK.

It is noted that the Node-B 1805 continuing to successfully receive the data 1840, 1850, 1860 through the initial transmission attempt and the two retransmission attempts is only exemplary. Although there is a high probability that the Node-B 1805 will maintain the same result over the 3.125 ms (over 5 slots) duration in which the data transmissions are performed by the source device 106, there is still a chance that the Node-B 1805 may also fail to receive the data transmission once or twice over the three data transmission attempts (but not thrice if the relay mechanism is to be used under the first private exchange scheme). However, particularly if the Node-B 1805 has successfully received the data transmission at least once in the three data transmission attempts, the Node-B 1805 may have received the data transmission from the source device 106 for subsequent operations to be performed, specifically the relay mechanism.

After the second retransmission attempt, the operations of the source device 106 for the current data transmission may conclude. For example, the source device 106 may declare a data transmission failure and proceed to a subsequent data transmission (e.g., in another interval of 12 slots). However, the Node-B 1805 and the Node-C 1820 may utilize the exemplary relay mechanism. Since the first six slots have been used for the initial transmission and the two retransmission attempts, the remaining six slots of the interval 1835 may be used for the relay attempts. After the Node-B 1805 transmits the uplink eSCO packet 1868, during an ensuing IFS, the Node-B 1805 and the Node-C 1820 may tune to the B2B piconet 104. As will be described in detail below, the Node-B 1805 and the Node-C 1820 may be configured with a setting or determine when to tune to the B2B piconet 104. The Node-B 1805 transitions to the transmission period 1815 while the Node-C 1820 transitions to the reception period 1825.

In the seventh slot, the Node-B 1805 transmits data 1870 which corresponds to any of the data 1840, 1850, 1860 that was received by the Node-B 1805 from the source device 106 during the initial transmission attempt, the first retransmission attempt, and the second retransmission attempt, respectively. Again, the data 1870 is transmitted over the B2B piconet 104 (which may be assumed to be robust with a higher likelihood of a successful transmission). The Node-C 1820 may receive the data 1872. Thereafter, in an IFS, the Node-B 1805 and the Node-C 1820 remain tuned to the B2B piconet 102, the Node-B 1805 transitions to the reception period 1810, and the Node-C transitions to the transmission period 1830. In the eighth slot, after a successful transmission using the relay mechanism, the Node-C transmits a confirmation 1876 (e.g., an ACK represented by a NULL packet) indicating that the data 1872 was successfully received. The Node-B 1805 may receive a response 1874 of the confirmation 1876. When the relay mechanism is used for a successful data transmission, in the following IFS, the Node-B 1805 and the Node-C 1820 may tune to the S2B piconet 102 and transition to the reception period 1810, 1825, respectively, in preparation to receive a data transmission from the source device 106 in a subsequent interval.

It is noted that the relay mechanism may include further attempt opportunities. That is, in contrast to what is shown in the first private exchange scheme of FIG. 18, the first relay attempt may not necessarily succeed (even despite having a robust link over the B2B piconet 104). However, assuming a more robust B2B piconet 104 (compared to the S2B piconet 102), there is a higher likelihood that the relay attempt succeeds. If the first relay attempt were to fail, the relay mechanism may include further attempts for the data transmission to be received by the secondary audio bud 110 from the primary audio bud 108 in a similar manner as the retransmission mechanism. However, there may be a preliminary operation to first determine whether there is sufficient time remaining in the interval 1835 for another relay attempt to be made (including any response operations).

It is also noted that the Node-B 1805 and the Node-C 1820 may utilize any known mechanism to verify whether a data transmission was properly received. For example, any of the data transmissions may include further data for the Node-B 1805 and the Node-C to perform a cyclic redundancy check (CRC). Those skilled in the art will understand that the exemplary embodiments may be modified to be used with any verification operation for the nodes to determine successful reception of a data transmission.

FIG. 19 shows a second private exchange scheme between the audio buds B and C over the B2B piconet according to various embodiments described herein. Specifically, the second private exchange scheme between the primary audio bud 108 and the secondary audio bud 110 shows when the primary audio bud 108 has failed to receive the data transmission from the source device 106 while the secondary audio bud 110 has successfully received the data transmission from the source device 106. In the second private exchange scheme, the primary audio bud 108 may be represented by the Node-B 1905 and the secondary audio bud 110 may be represented by the Node-C 1920. The Node-B 1905 may include a reception period 1910 and a transmission period 1915. The Node-C 1920 may include a reception period 1925 and a transmission period 1930. The second private exchange scheme may be performed over an interval 1935 which, as noted above, may be 7.5 ms and include 12 slots (slot 10 being partially shown and slots 11 and 12 not shown).

As illustrated, the second private exchange scheme may utilize substantially similar operations as the retransmission mechanism described above in FIGS. 12-13 for the first six slots of the interval 1935. Initially, the Node-B 1905 and the Node-C 1920 may be tuned to the S2B piconet prior to the start of the interval 1935. The Node-B 1905 and the Node-C 1920 may also transition to a receiving period corresponding to the reception period 1910, 1925, respectively prior to the start of the interval 1935. In this manner, the Node-B 1905 and the Node-C 1920 are prepared to receive the data transmission from the source device 106.

In contrast to the data transmission attempts from the source device 106 in the first private exchange scheme of FIG. 18, in an initial transmission attempt from the source device 106, the Node-C 1920 may receive data 1942 in the first slot. However, the Node-B 1905 may fail to receive data 1940 in the first slot. More specifically, the Node-B 1905 may not even be aware of the data transmission from the source device 106 despite being linked over the S2B piconet 102. After the initial transmission attempt, in an IFS thereafter, the Node-B may remain in the reception period 1910 while tuned to the S2B piconet 102 and the Node-C may transition to the transmission period 1930 while tuned to the S2B piconet 102.

Since the Node-C 1920 received the data 1942, while still in the first slot, the Node-C 1920 transmits a response 1946 (e.g., including an ACK) indicating a successful reception of the data transmission from the source device 106) to the Node-B 1905. Thus, the Node-B 1905 receives a response 1944 corresponding to the response 1946. It is noted that although the Node-B 1905 did not successfully receive the data 1940 from the source device 106 over the S2B piconet 102, the Node-B 1905 may still receive the response 1944 from the Node-C 1920 also over the S2B piconet 102. For example, particularly with regard to audio buds being worn in each ear, the Node-B 1905 and the Node-C 1920 are typically within a closer proximity to one another and potentially with less interference. Thus, the response 1946 transmitted from the Node-C 1920 and the response 1944 received by the Node-B 1905 may successfully be exchanged. With the Node-B 1905 receiving the response 1944 including an ACK, the Node-B 1905 may now become aware that the source device 106 has attempted to transmit data (e.g., data 1940) and that the Node-B 1905 has failed to successfully receive this data whereas the Node-C 1920 has successfully received the data 1942. It is again noted that the Node-B 1905 may be aware of the data transmission attempt for the data 1940 but failed to receive the data 1940. Thus, the reception of the response 1944 by the Node-B 1910 may be a redundant indication or a confirmation of the data transmission attempt from the source device 106.

Subsequently, in the second slot, the Node-B 1905 remains tuned to the S2B piconet but transitions to the transmission period 1915 to transmit an uplink eSCO packet 1948 to the source device 106. In this instance, since only the Node-C 1920 has successfully received the data transmission, the uplink eSCO packet 1948 includes a NACK.

After the initial transmission attempt, in the third slot, a retransmission attempt is performed by the source device 106. In a substantially similar manner as the initial transmission attempt, the Node-C 1920 may successfully receive data 1952 but the Node-B 1905 may fail to receive data 1950. Accordingly, response 1954, 1956 may be performed indicating the successful reception of the data 1952 by the Node-C 1920. Therefore, the uplink eSCO packet 1958 in the fourth slot may include a NACK. After the first retransmission attempt is performed, in the fifth slot, a second retransmission attempt is performed. Again, the Node-C 1920 may successfully receive data 1962 but the Node-B 1905 may fail to receive data 1960. Accordingly, response 1964, 1966 may be performed indicating the successful reception of the data 1962 by the Node-C 1920. Therefore, the uplink eSCO packet 1968 in the sixth slot may include a NACK.

It is again noted that the Node-C 1920 continuing to successfully receive the data 1942, 1952, 1962 through the initial transmission attempt and the two retransmission attempts is only exemplary but the Node-C 1920 successfully receives the data transmission from the source device 106 at least one (for the relay mechanism to be used under the second private exchange scheme).

After the second retransmission attempt, the operations of the source device 106 for the current data transmission may conclude. For example, the source device 106 may declare a data transmission failure and proceed to a subsequent data transmission (e.g., in another interval of 12 slots). However, the Node-B 1905 and the Node-C 1920 may utilize the exemplary relay mechanism. Since the first six slots have been used for the initial transmission and the two retransmission attempts, the remaining six slots of the interval 1935 may be used for the relay attempts. In a substantially similar manner as the first private exchange scheme of FIG. 18, after the Node-B 1905 transmits the uplink eSCO packet 1968, during an ensuing IFS, the Node-B 1905 and the Node-C 1920 may tune to the B2B piconet 104, the Node-B 1905 may transition to the transmission period 1915, and the Node-C 1920 may transition to the reception period 1925. As will be described in further detail below, the Node-B 1905 and the Node-C 1920 may be configured with a setting or determine when to tune to the B2B piconet 104 to utilize the exemplary relay mechanism.

In the seventh slot, the Node-B 1905 transmits a request 1970 (e.g., a POLL packet including no data) indicating that the Node-C 1920 is to relay/transmit the successfully received data transmission from the source device 106 to the Node-B 1905. The Node-C 1920 may receive the request 1972. Thereafter, in an IFS, the Node-B 1905 and the Node-C 1920 remain tuned to the B2B piconet 104, the Node-B 1905 transitions to the reception period 1910, and the Node-C transitions to the transmission period 1930. In the eighth slot, the Node-C 1920 may transmit data 1976 which corresponds to any of the data 1942, 1952, 1962 that was received by the Node-C 1920 from the source device 106 during the initial transmission attempt, the first retransmission attempt, and the second retransmission attempt, respectively. Again, the data 1976 is transmitted over the B2B piconet 104 (which may be assumed to be robust with a higher likelihood of a successful transmission). The Node-B 1905 may receive the data 1974. When the relay mechanism is used for a successful data transmission, in the following IFS, the Node-B 1905 and the Node-C 1920 may tune to the S2B piconet 102 and transition to the reception period 1910, 1925, respectively, in preparation to receive a data transmission from the source device 106 in a subsequent interval.

It is again noted that the relay mechanism as used in the second private exchange scheme may include additional attempts as described above for the first private exchange scheme. When the relay mechanism includes additional attempts and there is available remaining time in the interval 1935, the Node-B 1905 and the Node-C 1920 may remain tuned to the B2B piconet 104, the Node-B 1905 may transition to the transmission period 1915, and the Node-C 1920 may transition to the reception period 1930. Accordingly, the Node-B 1905 may transmit a further request 1970 and the Node-C 1920 may receive a further request 1972 for a subsequent relay attempt to be performed. It is noted that when the Node-B 1905 has failed to receive the data 1974 in the first relay attempt, all of the above operations may be performed. However, if the Node-B 1905 has successfully received the data 1974 in the first relay attempt, only the Node-C 1920 may be required to transition to the reception period 1925 over the B2B piconet 104. That is, the Node-B 1905 is not required to transition to the transmission period 1915 (e.g., to conserve power). When no data is received by the Node-C 1920 (e.g., until a time out period), the Node-C 1920 may assume that the Node-B 1905 has successfully received the data 1974 and may then tune to the S2B piconet 102 and transition to the reception period 1925.

It is noted that the relay mechanism may be dynamically utilized based on knowledge of the primary audio bud 108 and the secondary audio bud 110. For example, if both the primary audio bud 108 and the secondary audio bud 110 have knowledge of both audio buds 108, 110 successfully receiving a data transmission from the source device 106 or if both the primary audio bud 108 and the secondary audio bud 110 have knowledge that at least one of the audio buds 108, 110 failed to receive the data transmission from the source device 106, the primary audio bud 108 and the secondary audio bud 110 may perform the appropriate operations based on this knowledge. Specifically, if both the audio buds 108, 110 successfully receive the data prior to use of the relay mechanism, the audio buds 108, 110 are only required to remain tuned to the S2B piconet 102 and transition to the reception period. However, if at least one of the audio buds 108, 110 fail to receive the data during the transmission attempts by the source device 106, the audio buds 108, 110 may tune to the B2B piconet 104, the primary audio bud 108 may transition to the transmission period, and the secondary audio bud 110 may transition to the reception period.

With regard to how the audio buds 108, 110 have the knowledge, the primary audio bud 108 may always be privy to the status of whether a data transmission was successfully received or failed to be received by both of the audio buds 108, 110. Specifically, the audio bud 108 has knowledge of itself and has knowledge of the audio bud 110 through the responses received from the audio bud 110. However, since the audio bud 110 only has knowledge of itself but does not receive responses from the audio bud 108 (until the relay mechanism is actually triggered), the audio bud 110 may still have knowledge of the status of the audio bud 108. The exemplary embodiments include an operation to enable the audio bud 110 to have this knowledge. In a first operation, the audio bud 110 may eavesdrop on the S2B piconet 102 and if the source device 106 continues to make retransmission attempts (specifically the second and last retransmission attempt), the audio bud 110 may assume that the audio bud 108 has failed to receive the data transmission from the source device 106 or the audio bud 110 has itself missed a data transmission. For example, the audio bud 110 may monitor a number of a combined transmission and retransmission attempts. If the number exceeds a predetermined threshold (e.g., at least 2 which includes the initial transmission attempt and at least one retransmission attempt), the audio bud 110 may assume the audio bud 108 has failed to receive the data transmission. In a second operation, the audio bud 110 may be configured to always utilize the relay mechanism. Specifically, in the seventh slot, the audio bud 110 may tune to the B2B piconet 104 and transition to the reception period and wait for any transmission from the audio bud 108. If a request is received from the audio bud 108, the audio bud 110 may know that the relay mechanism is to be used to relay data received by the audio bud 110 to the audio bud 108. If a time out occurs with no request being received and the audio bud 110 having received the data from the source device 106, the audio bud 110 may know that the audio bud 108 has successfully received the data transmission. If data is being received from the audio bud 108 (rather than a request), the audio bud 110 may know that the audio bud 110 has missed a data transmission from the source device 106. In a third operation, the audio bud 110 may listen and monitor for all transmissions from the audio bud 108 bound for the source device 106 over the S2B piconet 102. If the audio bud 110 determines that a transmission includes a NACK in the uplink eSCO packet, the audio bud 110 is aware that the audio bud 108 has failed to receive a data transmission from the source device 106 if the audio bud 110 has received the data transmission (and the relay mechanism from the audio bud 110 to the audio bud 108 is to be used after all retransmission attempts are exhausted). Alternatively, the audio bud 110 may become aware that the audio bud 110 itself has missed the data transmission (and the relay mechanism from the audio bud 108 to the audio bud 110 is to be used after all retransmission attempts are exhausted). If the audio bud 110 determines that a transmission includes an ACK in the uplink eSCO packet, the audio bud 110 is aware that both the audio bud 108 and the audio bud 110 have received the data transmission from the source device 106.

It is noted that the relay mechanism and the retransmission mechanism may consider various static and/or dynamic configurations to the overall system according to various constraints and performance metrics. For example, the constraints/metrics may include power consumption, link reliability, network utilization, latency requirements, transmit/receive signal levels, etc. Thus, the exemplary embodiments described above including one initial transmission attempt, up to two retransmission attempts, and up to three relay attempts is only exemplary. That is, the number of retransmission attempts and the number of relay attempts may be modified accordingly based on the constraints/metrics. For example, when the power consumption becomes too high for retransmission attempts and/or relay attempts, both the retransmission mechanism and the relay mechanism may be set to a lower number of attempts before declaring a data transmission failure. In another example, when the link reliability of the B2B piconet 104 is significantly better than the S2B piconet 102 and the relay mechanism is available, the number of retransmission attempts may be decreased to allow for more relay attempts to be available.

It is noted that the use of the eSCO described above is only exemplary. In a first example, the eSCO forwarding packets may use an eSCO logical link on the UTP link. In such an exemplary embodiment, the eSCO link may be different from a standard BlueTooth eSCO link because the eSCO link is not scheduled at regular intervals but only when needed. Essentially, a "virtual" eSCO link only uses eSCO packet types and a retransmission/acknowledgement scheme.

In a second example, the eSCO forwarding packets on the UTP link may be BlueTooth Asynchronous (ACL) packets. The ACL packets may use the same logical link as the rest of the traffic on the UTP link. The eSCO forwarding data may be distinguished by a reserved logical link identifier (LLID) or other means. In such an exemplary embodiment, these packets are flushed every eSCO interval and have to share a sequence number and acknowledgement scheme with the rest of the UTP traffic. In a third example, the eSCO forwarding packets may use a separate logical ACL link. In such an exemplary embodiment, the packets have a BlueTooth address (e.g., LTADDR) different from a normal UTP ACL link. Those skilled in the art will understand that use of the ACL link may be used for non-real-time data (e.g., music streaming) since data is transferred without a specific prescribed regularity and is essentially transferred on a per-need basis.

As noted above, the eSCO link may have a limited number of retransmission attempts. However, other links may be used in which the number of retransmission attempts are not limited. The ACL link may include such a condition. In an ACL link, within certain practical limitations pertaining to buffer size and user experience, data transmission from the source device 106 may be retransmitted any number of times to ensure successful arrival at both the primary audio bud 108 and the secondary audio bud 110. However, the relay mechanism of the exemplary embodiments may still be applied beneficially in an ACL link as well. If either of the primary audio bud 108 or the secondary audio bud 110 generally has a low chance of success with receptions from the source device 106, a large number of retries from the source device 106 may be required to satisfy the weaker link's performance level. The exemplary embodiments may be applied to the ACL link under provisions of an Enhanced UTP forwarding mechanism in ACL. Specifically, after a given number of retransmissions from the source device 106, an opportunistic local exchange between the primary audio bud 108 and the secondary audio bud 110 over the B2B piconet 104 through proper slot manipulation may be used between retransmission attempts from the source device 106. If an opportunistic use of the relay mechanism results in both the primary audio bud 108 and the secondary audio bud 110 receiving the data from the source device 106, the primary audio bud 108 may transmit an ACK prior to a subsequent retransmission attempt being performed by the source device 106. In this manner, the source device 106 may terminate attempting to transmit the current data transmission (despite the audio bud 108 or the audio bud 110 failing to receive the data transmission over the S2B piconet 102) and move onto the next data transmission in its transmission queue. This operation may remove the burden off the S2B piconet 102 and the source device by exploiting the local UTP link (over the B2B piconet 104).

The exemplary embodiments may also be applied to a dynamic traffic structure and/or routing topologies. The exemplary embodiments described above are directed to a pre-defined and static networking structure and forwarding topology. Specifically, in the eSCO exemplary embodiments of FIGS. 12-13 and 18-19, there is a fixed number of retransmission attempts by the source device 106 (e.g., 2 retransmission attempts), followed by (if necessary and possible) a private relay mechanism between the primary audio bud 108 and the secondary audio bud 110 (e.g., where the primary audio bud 108 initiates the relay by either polling the secondary audio bud 110 to relay the data to primary audio bud 108 [if the primary audio bud 108 has failed to receive the data transmission but the secondary audio bud 110 has] or by forwarding the data to the secondary audio bud 110 [if the primary audio bud 108 has successfully received the data transmission but the secondary audio bud 110 has not]).

In other exemplary embodiments, a more dynamic network topology may be utilized to maximize efficiency in relation to latency, success/failure statistics, use of network capacity, and/or power usage. For example, as a function of circumstances between the primary audio bud 108 and the secondary audio bud 110 over the S2B piconet 102, the audio buds 108, 110 may determine to switch their roles such that the audio bud 108 and the audio bud 110 negotiate with each other and the source device 106 for the audio bud 108 to become secondary and the audio bud 110 to become primary. In this manner, the audio bud 110 may be linked to the source device 106 over the S2B piconet 102 while the audio bud 108 eavesdrops on the S2B piconet 102.

In another example, as noted above, a dynamic topology may enable exemplary embodiments where the number of retransmission attempts from the source device 106 may be dynamically traded for local forwarding. Specifically, if one of the audio buds 108, 110 has a generally favorable propagation condition while the other one of the audio buds 108, 110 has trouble communicating with the source device 106, the system may determine to omit the listening/eavesdropping operation by the primary audio bud 108 or secondary audio bud 110, respectively, (e.g., for some number of intervals) and rely exclusively on the relay mechanism from the audio bud that has a stronger link with the source device 106. Thus, the stronger link audio bud may receive the data transmission from the source device 106 (via listening or eavesdropping) and relay the data transmission to the other weaker link audio bud.

The exemplary embodiments enable establishment and dynamic management of the roles of the primary audio bud 108 and the secondary audio bud 110 with respect to the S2B piconet 102 and the B2B piconet 104. This may be performed as a function of a variety of factors including wireless link quality (perceived or anticipated), audio quality (perceived or anticipated), wireless coexistence with other protocols/links/devices, other sensing inputs that may be available (e.g., sound, acceleration, orientation, temperature, touch, pressure, light exposure, proximity to bodies/ materials, biometric readings (heart rate), etc.), etc. The relay mechanism may also be optimized in terms of protocol, frequency allocation, transmit power, modulation bandwidth, data rate, encoding, etc.

It is again noted that the eSCO link and the BlueTooth link for the piconets 102, 104 are only exemplary. The exemplary embodiments may utilize any number of network configurations for the source transmissions (from the source device 106 to the audio buds 108, 110) and the relay transmissions (between the audio buds 108, 110). For example, the S2B piconet 102 may be any BlueTooth network type or link configuration/profile (e.g., ACL, SCO, eSCO, Bluetooth Low Energy, other variants or configurations or profiles of Bluetooth, etc.). In another example, the B2B piconet 104 may be any of the same network types of link configurations (e.g., ACL, SCO, eSCO, Bluetooth Low Energy, other variants or configurations or profiles of Bluetooth, etc.). It is noted that the network type and/or link type used for the S2B piconet 102 is not required to match the network type and/or link type used for the B2B piconet 104. That is, the exemplary embodiments may be modified for any combination of network types and/or link types for the S2B piconet 102 and the B2B piconet 104.

The exemplary embodiments described above also relate to a unicast situation where the source device 106 transmits the data to the primary audio bud 108 over the S2B piconet 102 (with the secondary audio bud 110 eavesdropping on the S2B piconet 102). However, the exemplary embodiments may also be modified for use with a multitude of nodes such as in multicast or broadcast. For example, the exemplary embodiments may utilize the relay mechanism when the system includes more than three nodes whose networking topologies may favor eavesdropping versus forwarding and, statically and/or dynamically as a function of various environmental and network quality metrics, make use of various traffic routing methods. In an exemplary embodiment, such a multi-node system (including more than three nodes) may include the receiving nodes forming one or more B2B piconets as well as use eavesdropping for the information that arrives via broadcast or multicast distribution from the source device 106.

The exemplary embodiments described with regard to the enhanced UTP protocol may additionally be utilized for other use cases. In a first example, the exemplary embodiments may also be utilized for magnetic or near-field communications (NFC) in place of the B2B piconet 104. Since the relay mechanism benefits from a robust B2B piconet 104, another robust link may be created with a more magnetism-centric approach. A wireless link in the 2 GHz regime may not penetrate through the head (e.g., water content in human tissue attenuates the signal substantially over a small number of centimeters) such that signals have to creep around the head. In contrast, a magnetically coupled link penetrates easily through human tissue and may provide a good medium for the relay mechanism.

In a second example, other wireless networks for the UTP link may be used for the relay mechanism. For example, the exemplary embodiments may benefit from using other portions of the electromagnetic spectrum than the conventional 2.4 GHz ISM band (e.g., the 5-6 GHz ISM/UNII band or 60 GHz ISM band). In another example, the B2B piconet 104 may utilize proprietary high-speed wireless technology that minimizes air time and/or battery power for the relay transmission. Use of a proprietary high-speed wireless technology may include advanced channel encoding techniques (e.g., LDPC codes), wider signaling bandwidths supporting links of 2, 3, 4, 5, 8 Mb/s or higher, specialized modulation schemes, other modern means of fast digital and/or wireless communication, etc.

In a third example, the exemplary embodiments may be utilized in a multi-node system such as a speaker system. A wireless speaker system in a room (as opposed to audio buds) may be a suitable application of this enhanced UTP protocol. A source device may transmit to 2 or more wireless speakers. The source device may be a phone in a pocket or another device having a fairly weak or fading-impaired link with the speakers. The speakers may have a robust link (e.g., great line-of-sight to one another) with each other (e.g., since speakers may be placed relatively high above the floor and away from obstacles that may affect the link quality between the speakers). Therefore, a robust speaker link (in a corresponding speaker-to-speaker piconet) may help mitigate and overcome losses that each of the speakers may experience individually on the respective link with the source device.

In a fourth example, the exemplary embodiments may be utilized for other types of data. The exemplary embodiments described above are directed to audio data or voice data. However, the exemplary embodiments may be used (and appropriately modified) for other forms of data including video data, software/firmware downloads, etc.

Figure 20:
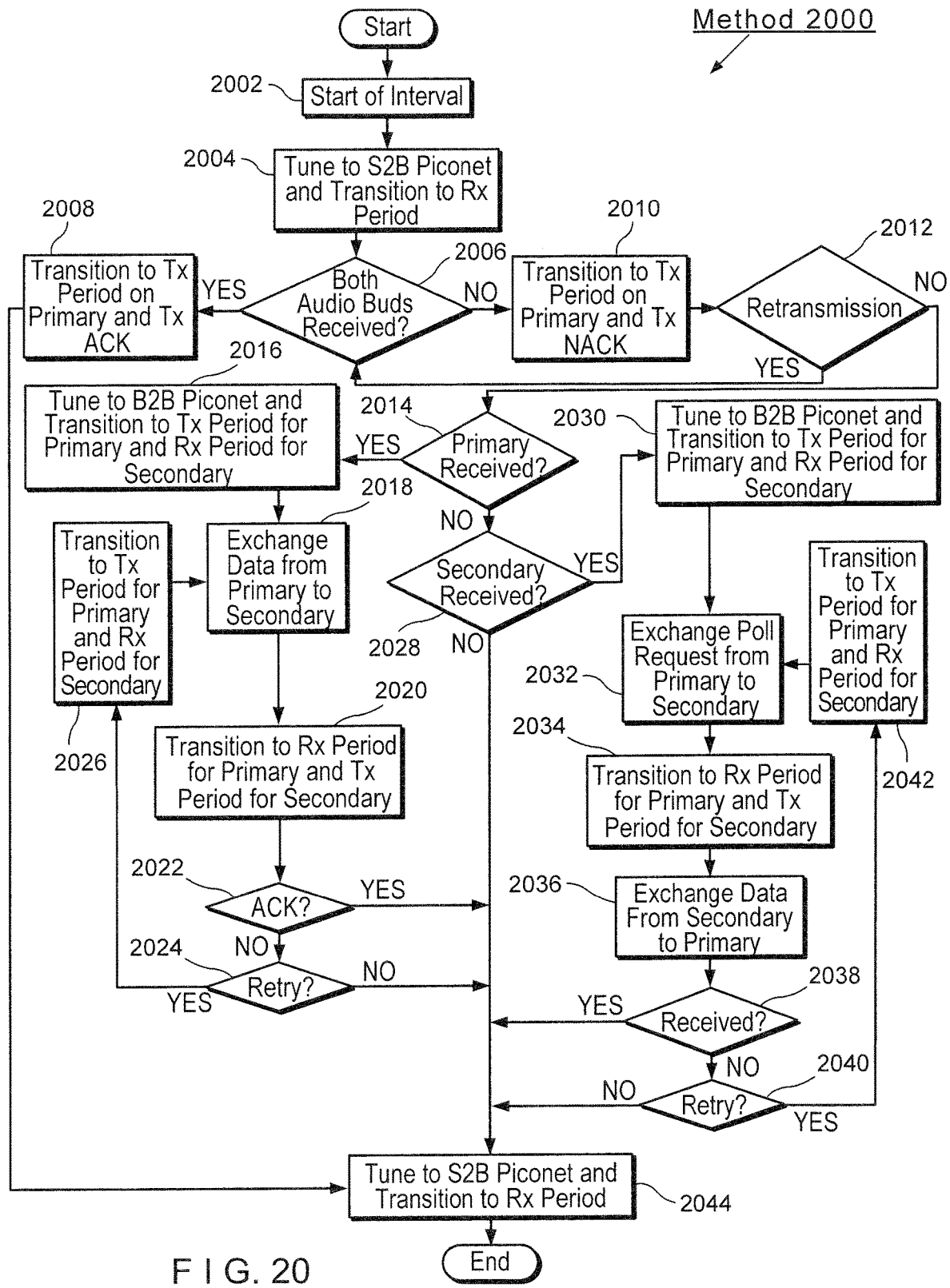
FIG. 20 shows an exemplary method for enhancing a real-time relay of wireless communications according to various embodiments described herein.

FIG. 20 shows an exemplary method 2000 for enhancing a real-time relay of wireless communications according to various embodiments described herein. Specifically, the method 2000 relates to the relay mechanism used after an initial transmission attempt and all retransmission attempts results in only one of the primary audio bud 108 or the secondary audio bud 110 receiving the data transmission from the source device 106. The method 2000 is described with respect to the primary audio bud 108 and the secondary audio bud 110. The method 2000 is also described as an overall process of utilizing the initial transmission attempt, the retransmission attempts, and/or the relay mechanism so that both the primary audio bud 108 and the secondary audio bud 110 receive the data transmission from the source device 106. As noted above, the method 2000 is described as operations performed within a single interval of the eSCO link (e.g., the partial-slot scheme A). However, it is again noted the use of the single interval and the eSCO link is only exemplary and further intervals (e.g., the partial-slot scheme A or the full-slot listen scheme) may be used or a different link may be used.

In 2002, the interval for a data transmission starts. As described above, in an eSCO link, a data transmission may be performed within an interval that is 7.5 ms long and includes 12 slots. A first slot may be reserved for an initial data transmission attempt by the source device 106. A second slot may be reserved for a response attempt by the primary audio bud 108. When two retransmission opportunities are available (and if the retransmission opportunities are needed), third and fifth slots may be reserved for a first and second retransmission attempt, respectively. Fourth and sixth frames (if necessary) may be reserved for a response attempt to the first and second retransmission attempts, respectively.

In 2004, the primary audio bud 108 and the secondary audio bud 110 tune to the S2B piconet 102 and transition to the reception period. As noted above, this operation by the audio buds 108, 110 may be performed prior to the start of the interval so that the audio buds 108, 110 are prepared from the start of the interval.

In 2006, the initial data transmission is performed by the source device 106 and the primary audio bud 108 and the secondary audio bud 110 attempt to receive the data transmission. A determination is made whether both the primary audio bud 108 and the secondary audio bud 110 have received the data transmission. As described above, the primary audio bud 108 has knowledge of whether it has successfully received the data transmission. With regard to the secondary audio bud 108, if the secondary audio bud 110 has successfully received the data transmission, an ACK included in a response from the secondary audio bud 110 to the primary audio bud 108 over the S2B piconet 102 (with the secondary audio bud 110 remaining on the S2B piconet 102 but remaining in the transmission period in an IFS after the data transmission is received) may indicate to the primary audio bud 108 that the secondary audio bud 110 has also successfully received the data transmission from the source device 106.

When both the primary audio bud 108 and the secondary audio bud 110 have successfully received the data transmission in the initial transmission attempt by the source device 106, in 2008, the primary audio bud 108 remains tuned to the S2B piconet 102 but transitions to the transmission period. The primary audio bud 108 transmits an uplink eSCO packet including an ACK to the source device 106. Thereafter, in 2044, the primary audio bud 108 and the secondary audio bud 110 remain tuned to the S2B piconet 102 and transition to the reception period (within the interval) in preparation for receiving subsequent data transmissions from the source device 106 in subsequent intervals. Accordingly, the method 2000 may be an iterative process in which after 2044, the method 2000 loops back to 2002.

Returning to 2006, if at least one of the primary audio bud 108 and the secondary audio bud 110 fails to receive the data transmission from the source device 106 from the initial data transmission attempt, in 2010, the primary audio bud 108 remains tuned to the S2B piconet 102 but transitions to the transmission period. As described above, during an IFS subsequent to the data transmission from the source device 106, the primary audio bud 108 may remain tuned to the S2B piconet 102 and remain on the reception period while the secondary audio bud 110 may also remain tuned to the S2B piconet 102 but transition to the transmission period for a response to be transmitted (or no response be transmitted if the secondary audio bud 110 completely misses the data transmission). In a first scenario, if the primary audio bud 108 has successfully received the data transmission but the secondary audio bud 110 has not, the primary audio bud 108 may determine the status of the secondary audio bud 110 via the response or a time out. In a second scenario, if the primary audio bud 108 has not received the data transmission but the secondary audio bud 110 has, the primary audio bud 110 may determine the status of the secondary audio bud 110 via the response. In a third scenario, if the primary audio bud 108 and the secondary audio bud 110 have not received the data transmission, the primary audio bud 108 may still perform the configuration operation. In 2010, the primary audio bud 108 also transmits an uplink eSCO packet including a NACK since at least one of the primary audio bud 108 and the secondary audio bud 110 have not received the data transmission.

In 2012, a determination is made whether a retransmission attempt is to be made by the source device 106. As described above, the system may be configured to utilize a retransmission mechanism where the source device 106 performs a further data transmission attempt when a NACK is received or a response is lost from the primary audio bud 108. However, particularly under the eSCO link, there may be limited opportunities for the retransmission attempt to be performed. As only the initial transmission attempt has been performed at this point, there may be at least one retransmission attempt that may be performed. Thus, the method 2000 returns to 2006.

However, if the source device 106 has performed all retransmission attempts (e.g., exhausted both retransmission attempts in slots three and five), the source device 106 may declare a lost data transmission and proceed to subsequent data transmissions in subsequent intervals. In contrast, the primary audio bud 108 and the secondary audio bud 110 may be configured to utilize the relay mechanism.

In 2014, a determination is made whether the primary audio bud 108 has received the data transmission from the source device 106. As 2006 has already confirmed that at least one of the audio buds 108, 110 has not received the data transmission, if the primary audio bud 108 has received the data transmission, then the secondary audio bud 110 has not received the data transmission. In 2016, in an IFS after a response operation for the final retransmission attempt, the primary audio bud 108 and the secondary audio bud 110 tune to the B2B piconet 104, the primary audio bud 108 transitions to the transmission period, and the secondary audio bud 110 transitions to the reception period.

With the primary audio bud 108 having received the data transmission, in 2018, the primary audio bud 108 relays/transmits the data to the secondary audio bud 110 over the B2B piconet 104. In an IFS after the initial relay attempt, in 2020, the primary audio bud 108 remains tuned to the B2B piconet 104 but transitions to a reception period while the secondary audio bud 110 also remains tuned to the B2B piconet 104 but transitions to a transmission period. In 2022, the secondary audio bud 110 transmits a response indicating an ACK or NACK to the primary audio bud 110 as to whether the secondary audio bud 110 has received the data transmission over the B2B piconet 104. If the secondary audio bud 110 has received the data transmission, the method 2000 continues to 2042. However, if the secondary audio bud 110 has not received the data transmission, the method 2000 continues to 2024. In 2024, the audio buds 108, 110 determine whether another relay attempt is to be made. For example, a remaining time in the interval may be determined which indicates if there is sufficient time for another relay attempt to be performed. If another relay attempt is to be made, the method 2000 continues to 2026 where the primary audio bud 110 remains tuned to the B2B piconet 104 and transitions to the transmission period while the secondary audio but 110 remains tuned to the B2B piconet 104 and transitions to the reception period for the next relay attempt in 2018. However, if no further relay attempt is to be performed, this may correspond to a lost data transmission as understood by the audio buds 108, 110 and operations are performed to prepare for subsequent data transmissions in 2042.

Returning to 2014, if the determination indicates that the primary audio bud 108 has not received the data transmission from the source device 106, the method 2000 continues to 2028. In 2028, a determination is made whether the secondary audio bud 108 has received the data transmission from the source device 106. As 2006 has already confirmed that at least one of the audio buds 108, 110 has not received the data transmission, if the secondary audio bud 110 has received the data transmission, then the primary audio bud 108 has not received the data transmission. In 2030, in an IFS after a response operation for the final retransmission attempt, the primary audio bud 108 and the secondary audio bud 110 tune to the B2B piconet 104, the primary audio bud 108 transitions to the transmission period, and the secondary audio bud 110 transitions to the reception period. It is again noted that the secondary audio bud 110 may be aware that the primary audio bud 108 has not received the data transmission from the source device 106 using information gleaned from eavesdropping on transmissions over the S2B piconet 102 or any of the other techniques described above.

With the secondary audio bud 110 having received the data transmission and armed with knowledge of this condition from the responses received from the secondary audio bud 110 by the primary audio bud 108 for the initial transmission attempt and the retransmission attempts, in 2032, the primary audio bud 108 relays/transmits a request (in a POLL packet including no data) to the secondary audio bud 110 over the B2B piconet 104. In an IFS after the request is relayed, in 2034, the primary audio bud 108 remains tuned to the B2B piconet 104 but transitions to a reception period while the secondary audio bud 110 also remains tuned to the B2B piconet 104 but transitions to a transmission period. In 2036, the secondary audio bud 110 transmits the data to the primary audio bud 110. In 2038, a determination is made whether the primary audio bud 108 has received the data transmission from the secondary audio bud 110 over the B2B piconet 104. If the primary audio bud 108 has received the data transmission, the method 2000 continues to 2044. However, if the primary audio bud 108 has not received the data transmission, the method 2000 continues to 2040. In 2040, the audio buds 108, 110 determine whether another relay attempt is to be made. If another relay attempt is to be made, the method 2000 continues to 2042 where the primary audio bud 110 remains tuned to the B2B piconet 104 and transitions to the transmission period while the secondary audio but 110 remains tuned to the B2B piconet 104 and transitions to the reception period for the next request to be transmitted over the B2B piconet 104 in 2032. However, if no further relay attempt is to be performed, this may correspond to a lost data transmission as understood by the audio buds 108, 110 and operations are performed to prepare for subsequent data transmissions in 2044.

The exemplary embodiments provide an apparatus, system and method that enhances a UTP link in a three node system where a source device transmits data to a primary audio bud and a secondary audio bud over a first piconet including the source device. Specifically, when a first redundant operation such as a retransmission mechanism fails to transmit the data to both the primary and secondary audio buds, the exemplary embodiments utilize a second redundant operation such as a relay mechanism over a second piconet between the primary and secondary audio buds where one of the primary and secondary audio buds that successfully received the data relays the data to the other one of the primary and secondary audio buds that did not receive the data. In this manner, instead of an additive principle of missed data transmissions that increases a system data loss (e.g., over an acceptable system data loss threshold), the system data loss is actually decreased (significantly) as a multiplicative principle is used where the system data loss occurs only when both the primary and secondary audio buds simultaneously fail to receive the data transmission (which is a rare occurrence) when the robust second piconet succeeds in relaying the data transmission.

It will be apparent to those skilled in the art that various modifications may be made in the present disclosure, without departing from the spirit or scope of the disclosure. Thus, it is intended that the present disclosure cover the modifications and variations of this disclosure provided they come within the scope of the appended claims and their equivalents.

What is claimed is:

1. A method, comprising:
   at a first wireless audio output device configured to connect to a source device via a first piconet and configured to connect to a second wireless audio output device via a second piconet, wherein the second wireless audio output device is configured to eavesdrop on the first piconet, and wherein the source device is configured to limit transmission of an audio packet to a predetermined maximum number of attempts via the first piconet using one or more of a plurality of transmission slots:
   determining whether the first and second wireless audio output devices successfully received the audio packet within the predetermined maximum number of attempts; and
   when, after the predetermined maximum number of attempts, at least one of the first or second wireless audio output devices did not successfully receive the audio packet, relaying the audio packet between the first and second wireless audio output devices via the second piconet such that both the first and second wireless audio output devices receive the audio packet,
   wherein, responsive to determining that the first wireless audio output device did not successfully receive the audio packet, the relaying comprises:
      transmitting a poll packet to the second wireless audio output device via the second piconet, the poll packet indicating that the wireless audio output device did not receive the audio packet; and
      listening, on the second piconet, for a transmission from the second wireless audio output device including the audio packet.

2. The method of claim 1, wherein determining whether the second wireless audio output device successfully received the audio packet comprises listening, after a transmission slot, for a response from the second wireless audio output device via the first piconet.

3. The method of claim 1, wherein, responsive to determining that the second wireless audio output device did not successfully receive the audio packet, the relaying comprises:
   transmitting the audio packet to the second wireless audio output device via the second piconet; and
   listening, on the second piconet, for a response from the second wireless audio output device indicating the second wireless audio output device successfully received the audio packet.

4. The method of claim 3, wherein the relaying further comprises:
   when the response is not received from the second wireless audio output device, retransmitting the audio packet via the second piconet.

5. The method of claim 1, wherein the relaying further comprises:
when the transmission is not received after a predetermined period of time, retransmitting the poll packet to the second wireless audio output device via the second piconet; and
listening, on the second piconet, for the transmission from the second wireless audio output device including the audio packet.

6. The method of claim 1, further comprising:
transmitting via the first piconet, after each of the plurality of transmission slots when at least one of the first or second wireless audio output devices did not successfully receive the audio packet, a negative acknowledgement (NACK) to the source device.

7. The method of claim 1, wherein the predetermined maximum number of attempts corresponds to a subset of the plurality of transmission slots based on a schedule for the first piconet.

8. A system, comprising:
a first wireless audio output device configured to connect to a source device via a first piconet; and
a second wireless audio output device configured to connect to the first wireless audio output device via a second piconet and further configured to eavesdrop on the first piconet,
wherein a schedule of the first piconet includes a plurality of slots associated with an audio packet, a first subset of the slots reserved for a maximum number of transmission attempts by the source device to transmit the audio packet, the first and second wireless audio output devices tuning to the first piconet at times corresponding to the first subset of the slots to listen for the transmissions of the audio packet,
wherein when, after a last one of the first subset of slots, at least one of the first or second wireless audio output devices did not successfully receive the audio packet during any of transmission attempts, the first and second wireless audio output devices exchange information via the second piconet such that the at least one of the first or second wireless audio output devices that did not successfully receive the audio packet receives the audio packet, and
wherein, when the first wireless audio output device did not successfully receive the audio packet, the information exchange comprises the first and second wireless audio output devices tuning to the second piconet and the first wireless audio output device transmitting a poll packet to the second wireless audio output device and the second wireless audio output device transmitting the audio packet in response to the poll packet.

9. The system of claim 8, wherein, when the second wireless audio output device did not successfully receive the audio packet, the information exchange comprises the first and second wireless audio output devices tuning to the second piconet and the first wireless audio output device transmitting the audio packet during a slot subsequent to the last one of the first subset of slots.

10. The system of claim 9, wherein, when the second wireless audio output device successfully receives the audio packet during the slot subsequent to the last one of the first subset slots, the information exchange further comprises the second wireless audio output device transmitting a response via the second piconet indicating the successful receipt of the audio packet.

11. The system of claim 8, wherein, when the second wireless audio output device does not successfully receive the audio packet during the slot subsequent to the last one of the first subset slots, the information exchange further comprises the first wireless audio output device retransmitting the audio packet during a further slot that is subsequent to the slot.

12. A method, comprising:
at a first wireless audio output device configured to connect to a second wireless audio output device via a first piconet and configured to eavesdrop on a second piconet formed between the second wireless audio output device and a source device, and wherein the source device is configured to transmit an audio packet using a predetermined maximum number of attempts via the second piconet using a plurality of transmission slots:
listening, by the first wireless audio output device, to the second piconet at one or more predetermined times associated with the plurality of transmission slots of the audio packet;
after one of the plurality of transmission slots corresponding to the predetermined maximum number of attempts, tuning to the first piconet;
when the audio packet was not successfully received, listening to the first piconet at a predetermined time for the second wireless audio output device to transmit the audio packet; and
when the audio packet was successfully received, listening to the first piconet at a predetermined time for the second wireless audio output device to transmit a poll packet indicating that the second wireless device did not successfully receive the audio packet.

13. The method of claim 12, further comprising:
when the audio packet is successfully received by the first wireless audio output device via the first piconet, transmitting an acknowledgement to the second wireless audio output device; and
tuning back to the second piconet.

14. The method of claim 12, further comprising:
when the audio packet is not successfully received by the first wireless audio output device via the first piconet, transmitting a negative acknowledgement to the second wireless audio output device; and
listening to the first piconet at a further predetermined time for the second wireless audio output device to retransmit the audio packet.

15. The method of claim 12, further comprising:
responsive to receiving the poll packet, transmitting the audio packet to the second wireless audio output device via the first piconet.

16. The method of claim 12, further comprising:
for each successful receipt of the audio packet, transmitting, via the first piconet, a response to the second wireless audio output device indicating the successful receipt of the audio packet.

* * * * *